US006230780B1

(12) United States Patent
Rietheimer

(10) Patent No.: US 6,230,780 B1
(45) Date of Patent: May 15, 2001

(54) LABEL APPLICATOR MECHANISM AND HAND-HELD LABELLER

(75) Inventor: William R. Rietheimer, Cashmere, WA (US)

(73) Assignee: Automated Systems Technology, L.L.C., Cashmere, WA (US)

( * ) Notice: Subject to any disclaimer, the term of this patent is extended or adjusted under 35 U.S.C. 154(b) by 0 days.

(21) Appl. No.: 09/070,941

(22) Filed: Apr. 30, 1998

(51) Int. Cl.[7] ..................... B32B 31/00

(52) U.S. Cl. ..................... 156/577; 156/574; 156/579; 156/541

(58) Field of Search ..................... 156/574, 577, 156/579, 541

(56) References Cited

U.S. PATENT DOCUMENTS

| | | | | |
|---|---|---|---|---|
| 3,616,050 | | 10/1971 | Schrotz | 156/358 |
| 3,745,083 | * | 7/1973 | Aungst et al. | 156/384 X |
| 4,129,473 | | 12/1978 | Perret | 156/364 |
| 4,194,941 | | 3/1980 | Briggs et al. | 156/361 |
| 4,294,644 | | 10/1981 | Anderson | 156/361 |
| 4,328,063 | | 5/1982 | Ingalls | 156/361 |
| 4,358,333 | * | 11/1982 | Holland-Letz | 156/584 X |
| 4,386,860 | | 6/1983 | Price et al. | 400/124 |
| 4,488,925 | | 12/1984 | Craig et al. | 156/351 |
| 4,490,206 | | 12/1984 | Makley | 156/384 |
| 4,519,868 | | 5/1985 | Hoffmann | 156/353 |
| 4,552,608 | | 11/1985 | Hoffmann et al. | 156/351 |
| 4,896,793 | | 1/1990 | Briggs et al. | 221/73 |
| 5,015,324 | | 5/1991 | Goodwin et al. | 156/384 |
| 5,061,947 | * | 10/1991 | Morrison et al. | 156/577 X |
| 5,254,189 | | 10/1993 | Hirobe et al. | 156/64 |
| 5,286,317 | | 2/1994 | Treat et al. | 156/64 |
| 5,387,302 | | 2/1995 | Bernard et al. | 156/352 |
| 5,399,228 | * | 3/1995 | Schroeder et al. | 156/584 X |
| 5,431,274 | | 7/1995 | Schaupp | 198/474.1 |
| 5,489,360 | | 2/1996 | Shimizu et al. | 156/542 |
| 5,524,993 | | 6/1996 | Durst | 400/279 |
| 5,645,680 | | 7/1997 | Rietheimer | 156/567 |

* cited by examiner

*Primary Examiner*—Mark A. Osele
(74) *Attorney, Agent, or Firm*—Wells, St. John, Roberts, Gregory & Matkin, P.S.

(57) ABSTRACT

A label applicator mechanism includes a support member and a guide member. The support member is configured to carry a carrier web containing a plurality of sequentially supported labels for delivery to individual articles. The guide member is supported by the support member. The guide member has an application edge over which the carrier web is folded so as to separate individual labels from the carrier web as the carrier web is moved under tension over the application edge. The guide member has a coefficient of friction with the carrier web which is less than the coefficient of friction of the support member.

20 Claims, 18 Drawing Sheets

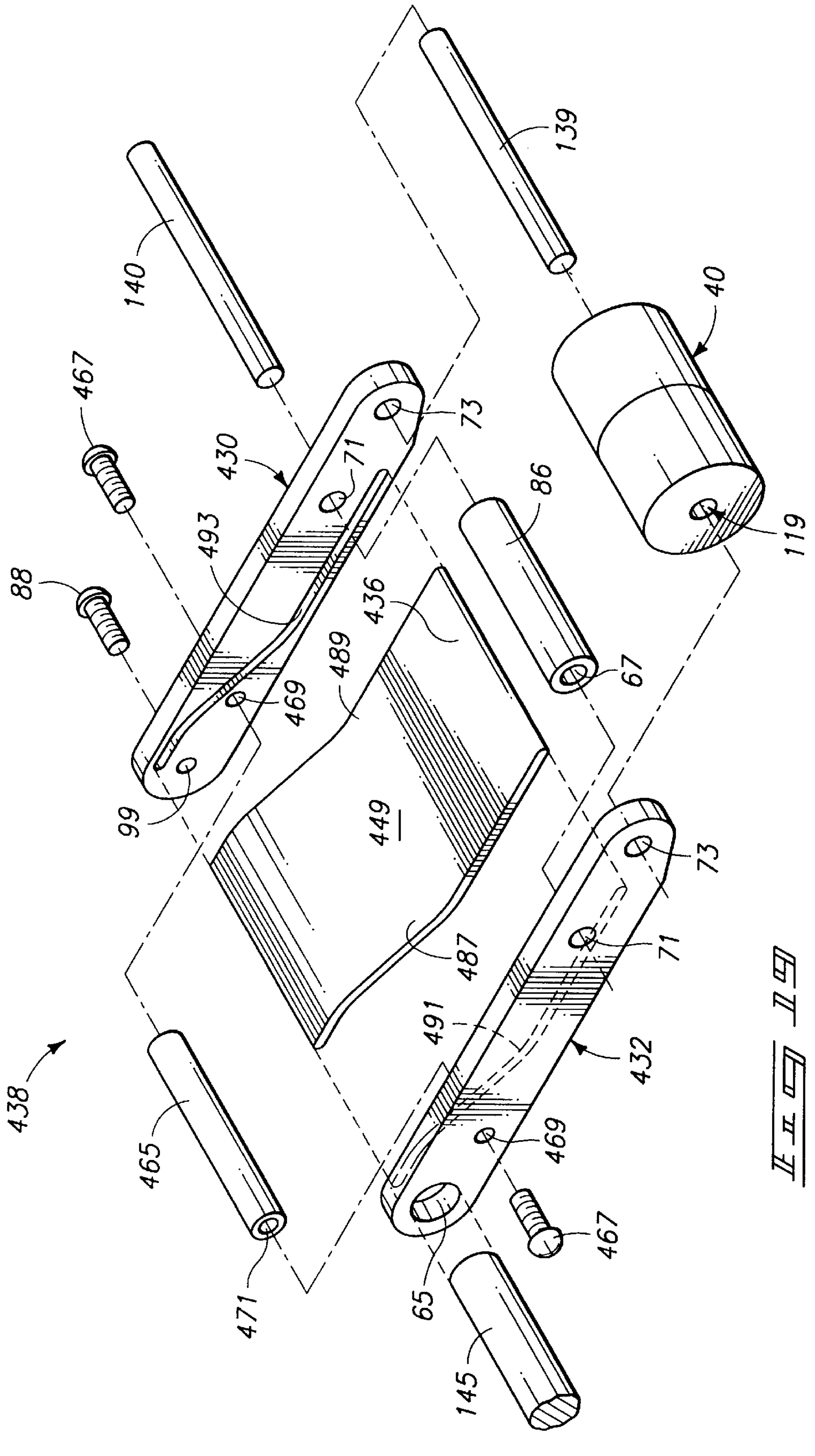
438
465
471
140
467
88
430
493
469
99
71
73
489
436
449
487
86
67
139
40
119
73
71
491
432
469
467
65
145

LABEL APPLICATOR MECHANISM AND HAND-HELD LABELLER

TECHNICAL FIELD

This invention relates to apparatus for applying labels to articles whether stationary or in motion, and more particularly to an improved hand-held labeller and label applicator mechanism that provides for low cost, improved application, and electronic-controlled delivery of individual labels to individual articles being labelled.

BACKGROUND OF THE INVENTION

Hand labellers have been used for years by merchants to apply labels to articles or goods. One such recently improved labeller is disclosed in U.S. Pat. No. 4,490,206, and is directed to a complicated and expensive hand-held labeller that prints and applies labels to articles. However, such labeller is manufactured with costly components, significantly limiting the market potential for such device.

There exists a need for improvements that facilitate relatively low cost and portable application of labels dispensed from a backing carrier, or web, onto individual articles such as fruits, vegetables, or consumer articles. Such need is in the nature of an improvement over prior art hand labellers in that the ready application of labels is obtained by delivering labels having desired label information in a lightweight, compact, low-cost and portable device. Instead of relying on a highly complicated, costly, and heavy device, the essential features of the present invention contemplate a relatively simple and lightweight hand-held unit that reduces adhesive gumming of an applicator mechanism, improves label delivery from a carrier web to an article, enhances controlled application of labels from a label applicator, accurately delivers labels with a relatively low cost delivery device, has an improved operating mode that prevents immediately-successive inadvertent label applications, and has an improved applicator comprising a label transfer mechanism that improves label delivery to articles.

SUMMARY OF THE INVENTION

An apparatus and method for delivering adhesive articles such as labels and security tags to articles includes several features. According to a general aspect of the invention, a hand-held labeller includes a housing having a handle and a label reel support member. The label reel support member is supported by the housing and is operative to carry a reel of labels, including labels releasably carried by a carrier web. The labeller further includes a peel plate assembly pivotally carried by the housing and operative to deliver labels to articles brought into contact therewith by separating labels from a carrier web there along. A spring is provided on the labeller for biasing the peel plate assembly for presentment with an article being labelled. The labeller further includes a drive roll carried by the housing downstream of the peel plate assembly and operative to deliver the carrier web and labels to the peel plate assembly. The labeller further includes a take-up roll carried by the housing downstream of the peel plate assembly and operative to deliver and store the carrier web. The labeller further includes a microswitch provided in the housing that is operative to detect pivotal movement of the peel plate assembly when engaging/disengaging with an article during application of a label. A stepper motor is carried by the labeller housing and is coupled to drive the drive roll and take-up roll so as to advance delivery of labels for application to articles by the peel plate assembly. Additionally, control circuitry is coupled with the stepper motor and the microswitch. The control circuitry receives a feedback signal from the microswitch indicative of pivotal movement of the peel plate assembly responsive to “engagement with an article” or “release from an article”. The control circuitry is operative to send a drive signal to the stepper motor responsive to the feed signal, directing feeding of another label for presentment by the peel plate assembly and application to a subsequent article. A method for delivery labels to articles is also provided.

According to another aspect of the invention, a label applicator mechanism includes a support member and a guide member. The support member is configured to carry a carrier web containing a plurality of sequentially supported labels for delivery to individual articles. The guide member is supported by the support member. The guide member has an application edge over which the carrier web is folded so as to separate individual labels from the carrier web as the carrier web is moved under tension over the application edge. The guide member has a coefficient of friction with the carrier web which is less than the coefficient of friction of the support member.

According to yet another aspect of the invention, a hand-held labelling machine includes a housing, a label delivery apparatus supported by the housing, and a label applicator supported by the housing. The housing is configured to carry a label reel including a carrier web containing a plurality of labels. The label delivery apparatus is supported by the housing and is configured to move the carrier web and the labels for delivery to individual articles. The label applicator is supported by the housing and is configured to separate and deliver the labels from the carrier web to individual articles. The label applicator has a support member and a guide member operative to deliver and separate the labels from the carrier web. The guide member has a coefficient of friction with the carrier web which is less than the coefficient of friction of the support member.

According to even another aspect of the invention, a label applicator mechanism includes a support member, a guide member carried by the support member, and a guide roller carried by the support member. The support member is configured to support a carrier web containing a plurality of adhesive-backed labels for delivery to articles. The guide member has an application edge over which the carrier web is drawn under tension to separate individual labels therefrom. The guide roller is carried by the support member adjacent to the guide member. The label and the carrier web are configured to be received between the guide roller and the guide member upstream of the application edge. The labels tend to eject adhesive onto the carrier web during storage and delivery. The guide member has a lower coefficient of contact friction with the carrier web than the support member in order to reduce adhesive gumming-up of the applicator mechanism.

According to another aspect of the invention, a label applicator mechanism includes a label applicator, an application roller supported by the label applicator, and a label delivery shelf supported by the label applicator. The label applicator includes a label guide and an application edge. The label delivery shelf is supported adjacent and in spaced-apart relation with the application edge, and is configured to receive a label from a carrier web. The application roller and the label delivery shelf cooperate to support a label for delivery to an article following separation of the label from the carrier web along the application edge.

According to yet another aspect of the invention, a label delivery control apparatus and method are provided for separating labels from a carrier web and delivering such labels to a delivery shelf. Control circuitry is configured to move the carrier web and labels such that individual labels are deposited onto the delivery shelf. An operator then applies the labels from the delivery shelf onto individual articles. A method according to such apparatus is also taught.

Objects, features and advantages of this invention are to provide a lightweight, low cost, and electronic hand-held labeller which is easily and economically produced for applying individual labels to articles such as fruit and vegetables, can provide delivery of various sized labels via a simplified reconfiguration of the delivery characteristics for the labeller, is relatively lightweight and has a separate, detachable battery pack, can be operated with a recharger, has a stepper delivery motor with a feedback sensor for implementing closed-loop delivery of labels from a web-shaped carrier stored in a roll, has a touch-activated delivery mechanism with damping features, has a label delivery shelf, has a relatively low-friction carrier web guide, has an improved waste carrier take-up reel, and has a lightweight construction, has a significantly longer useful life, and is simple, stable, rugged, durable, reliable, quick and easy to assemble/disassemble and/or maintain and repair, and is of relatively simple design and economical manufacture and assembly.

BRIEF DESCRIPTION OF THE DRAWINGS

Preferred embodiments of the invention are described below with reference to the following accompanying drawings.

FIGS. 13A and 13B form a flowchart illustrating motor step subroutines for the hand labeller;

FIG. 19 is an exploded perspective view of another alternative construction for the peel plate assembly depicted in FIG. 18.

DETAILED DESCRIPTION OF THE PREFERRED EMBODIMENTS

Figure 1:
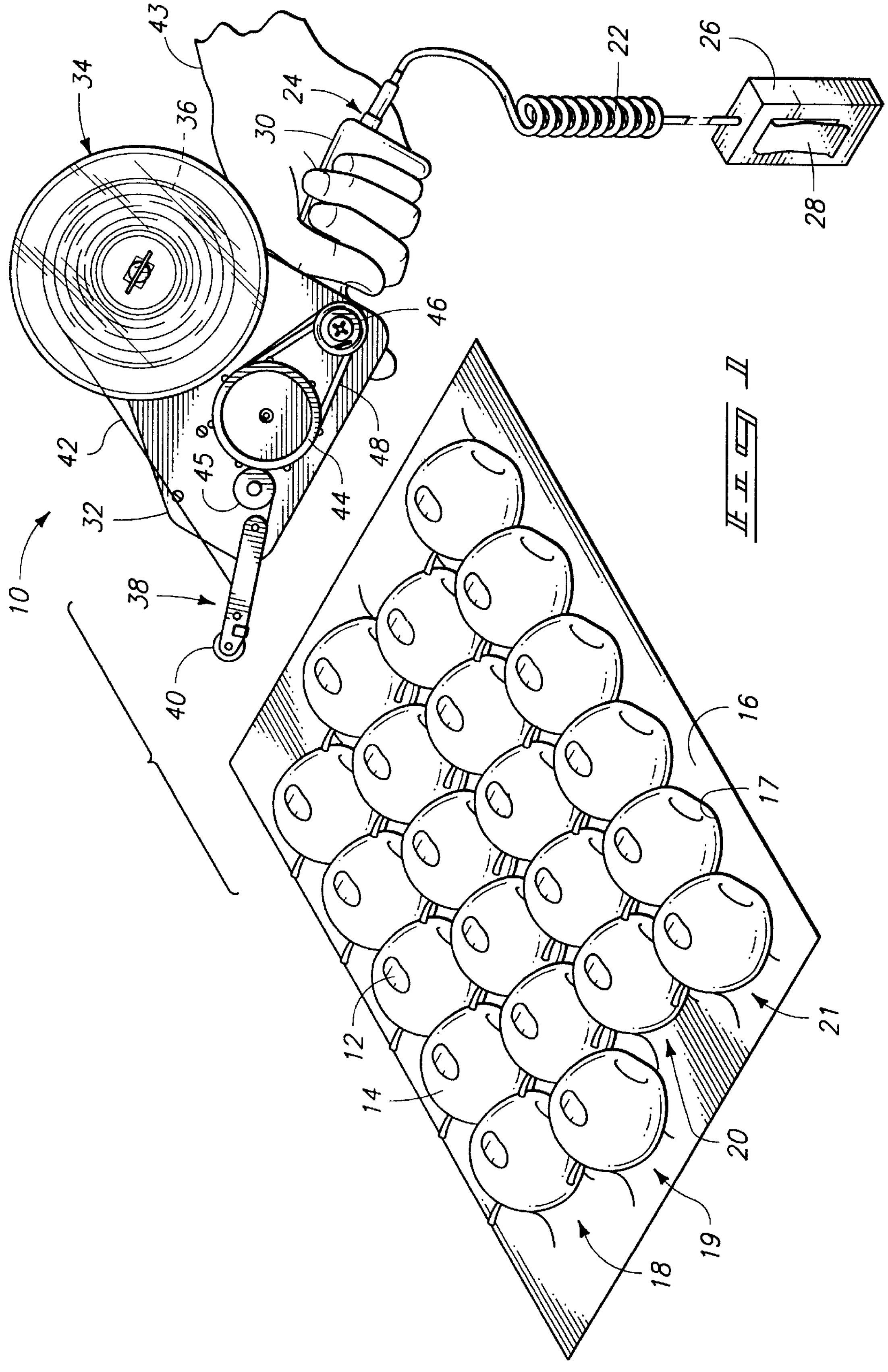
FIG. 1 is a perspective view of an electronic hand-held labeller illustrated in connection with a plurality of tray-supported fruit articles being individually labelled by an operator via the labeller.

This disclosure of the invention is submitted in furtherance of the constitutional purposes of the U.S. Patent Laws "to promote the progress of science and useful arts" (Article 1, Section 8).

A preferred embodiment low-cost, lightweight hand-held labeller suitable for use by individuals applying labels to articles such as fruit and produce within a packing house, store, or shipping environment is first described with reference to FIGS. 1–16. Such show various aspects and dimensional characteristics described further below with respect to an electronic, hand-held labeller designated in FIGS. 1–6, generally with reference numeral 10. However, it is understood that modifications can be made to labeller 10 to enable delivery of other types of labels, or tags, to articles, such as for delivery of security labels to consumer goods as shown by an alternative embodiment depicted in FIG. 14.

Labeller 10 is configured for lightweight hand-held use by an operator when applying labels 12 to articles 14, such as apples, particularly when supported within a storage tray 16. Tray 16 is typically used to store assorted produce articles, and following application of labels 12, tray 16 and articles 14 are stacked within delivery or shipping boxes (not shown). Each article 14 is received within a recess 17 wherein a plurality of rows 18–21 of such recesses 17 are used to compactly store articles 14 on tray 16. The presentment of articles 14 in such rows 18–21 further facilitates quick and easy application of labels 12 by an operator with hand-held labeller 10. Labeller 10 is lowered and dragged such that a label application portion, or label applicator mechanism, of labeller 10 is guided along one of rows 18–21 to apply a label 12 to each article 14 by way of indexed, electronically-controlled touch activation.

With reference to FIG. 1, hand-held labeller 10 comprises a support frame in the form of a housing 32 having an integrally molded handle 30. Labeller 10 also includes a label reel support canister 34 for carrying a label reel 36, and a label transfer mechanism comprising a peel plate assembly 38 for separating and applying labels 12 via touch-activation. Such label transfer mechanism of assembly 38 forms a label applicator mechanism. A separate battery pack 26 is also provided to power labeller 10. Battery pack 26 removably couples with handle 30 via a power cable 22 and an electrical connector 24.

Battery pack 26 enables the removal of batteries from housing 32 so that the batteries can be separately supported on a user's belt or clothing by way of a clip 28. In this manner, the hand-held portion of labelling machine 10 can be significantly reduced in overall weight. Connector 24 comprises a pair of male and female threaded electrical connector components that removably mate together. One connector component is formed on the end of cable 22, and the other connector component is formed on handle 30. Connector 24 enables electrically coupled mating and demating of handle 30 from battery pack 26, with power cable 22 being appropriately sized to enable a user to hand-operate labeller 10. Optionally, labeller 10 can be powered with an alternating current (AC) power supply 226 which is described below in greater detail with reference to FIG. 2. In one form, such AC power supply 226 also comprises a battery charger operable to charge batteries that are optionally stored in handle 30.

Hand-held labeller 10 applies labels 12 to articles 14 when an operator 43 brings an application roller 40 of peel plate assembly 38 into contact with an article 14. In use, an operator 43 pulls labeller 10 via handle 30 towards himself or herself, which causes application roller 40 to press and apply a label to an associated article 14. Such label is delivered from a carrier web 42 to a delivery shaft 57 prior to engagement with an article 14. Additional labels are subsequently drawn from label reel 36 and applied to successive articles 14. Peel plate assembly 38 is provided with a limited amount of pivotal movement relative to housing 30 such that contact of application roller 40 with an article 14 causes slight rearward, or upward, pivoting of peel plate assembly 38. Such pivoting activates a contact switch within housing 32. Upward movement of peel plate assembly 38 following interaction with article 14 causes the contact switch to release as the peel plate assembly 38 pivots downward to a resting, return position.

According to one implementation, successful application of a label is detected when the switch is released, and a subsequent label is delivered in response to release of the switch via an indexed drive roll 44. Drive roll 44 is driven by a motor housed internally within housing 32. Alternatively, activation of the contact switch via urging of application roller 40 into contact with an article can trigger indexed feeding of a subsequent label.

A shown in FIG. 1, peel plate assembly 38 forms part of a label transfer mechanism that feeds carrier web 42 from reel 36, while separating labels 12 therefrom. Carrier web 42 exits support canister 34 by way of an aperture 74 (see FIG. 3) where it is delivered to peel plate assembly 38. Carrier web 42 supports removable labels 12 in spaced apart relation, with the carrier web being doubled back immediately adjacent to application roller 40. Individual labels are released from web 42 as web 42 is doubled or folded back, causing labels 12 to separate therefrom. Labels 12 are individually peeled from carrier web 42 as web 42 is doubled back, delivered onto a delivery shelf 57, and then applied by roller 40 onto articles 14.

Figure 2:
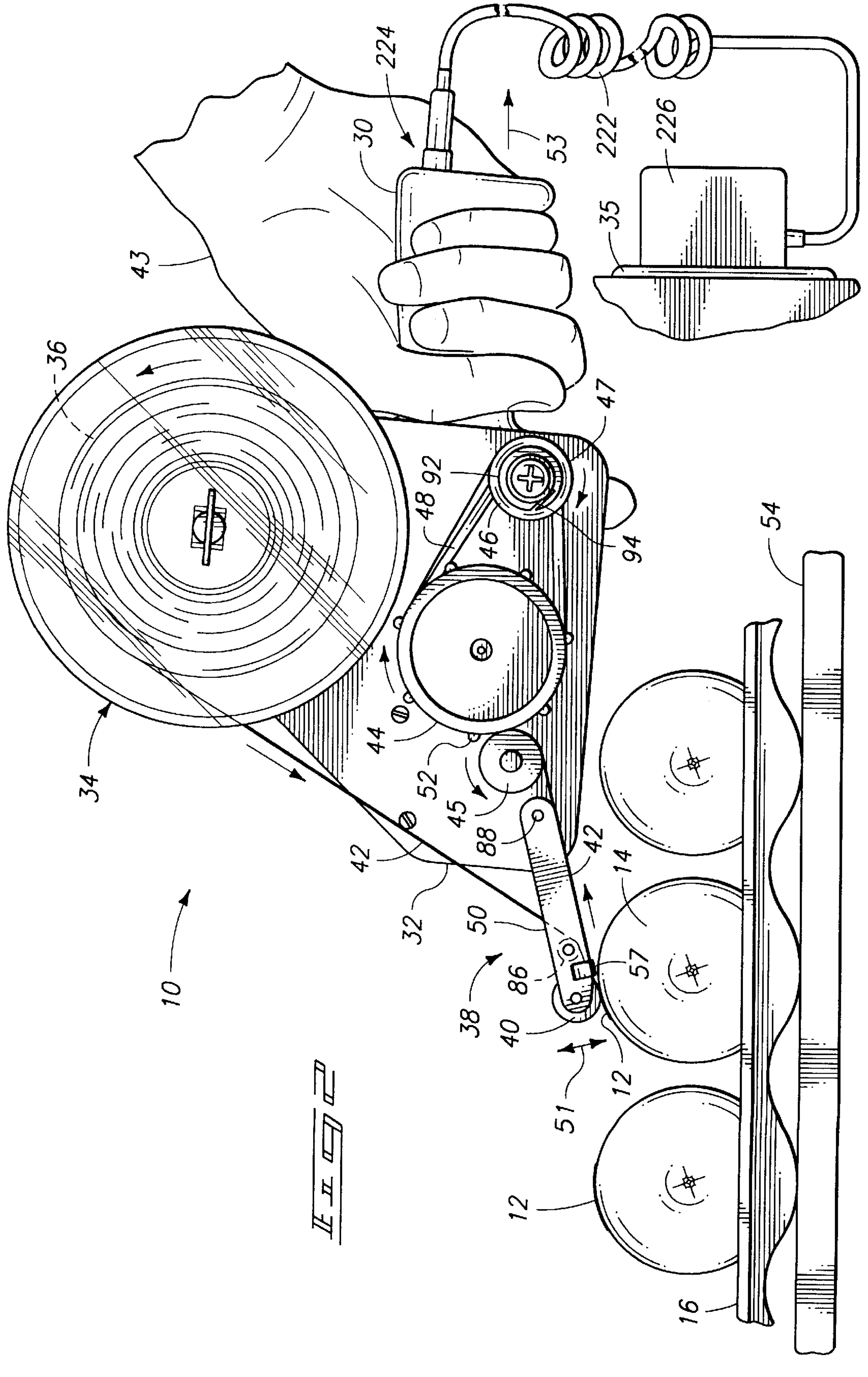
FIG. 2 is an enlarged elevational view of the electronic hand-held labeller of FIG. 1 during hand-held and touch-activated delivery of a label to an article of fruit.
Figure 3:
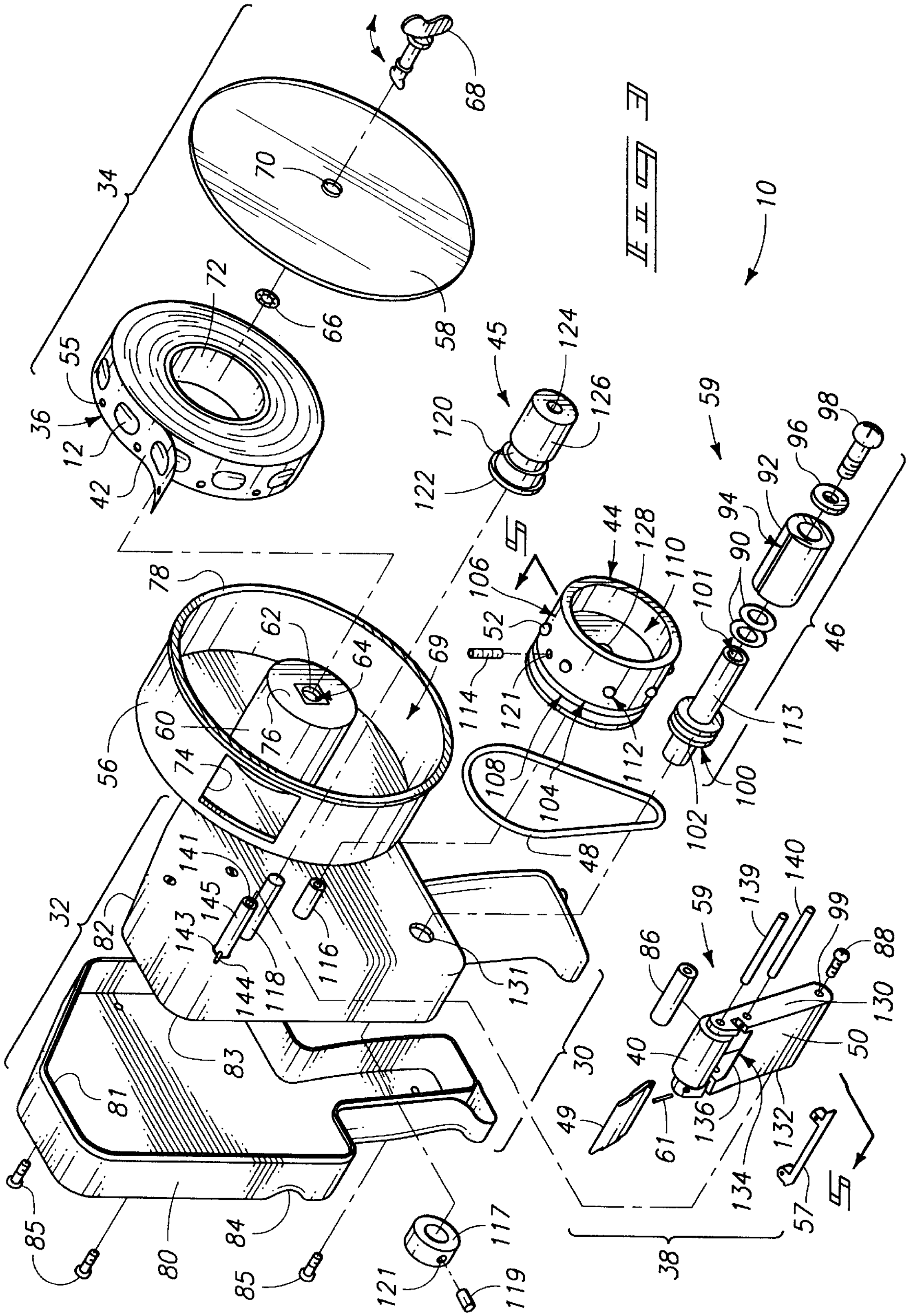
FIG. 3 is an enlarged exploded perspective view illustrating the electronic hand-held labeller of FIGS. 1 and 2, showing the various mechanical components carried by the support housing.

As shown in FIGS. 2 and 3, individual adhesive-backed labels 12 are provided in spaced apart locations along carrier web 42. Labels 12 are dispensed from web 42 where they are stored for later delivery. Labels 12 comprise self-adhesive die-cut labels that are mounted on carrier web (or liner) 42. Carrier web 42, as shown in FIG. 1, is drawn from label supply reel 36 and passed sharply around an end portion of peel plate assembly 38 which causes individual labels 12 to separate from carrier web 42. Carrier web 42, minus the applied labels 12, is then passed rearwardly of an idler roller 45, around an indexed drive roll 44, and onto a waste take-up roll 46 where a scrap portion of carrier web 42 is stored for later removal.

Figure 4:
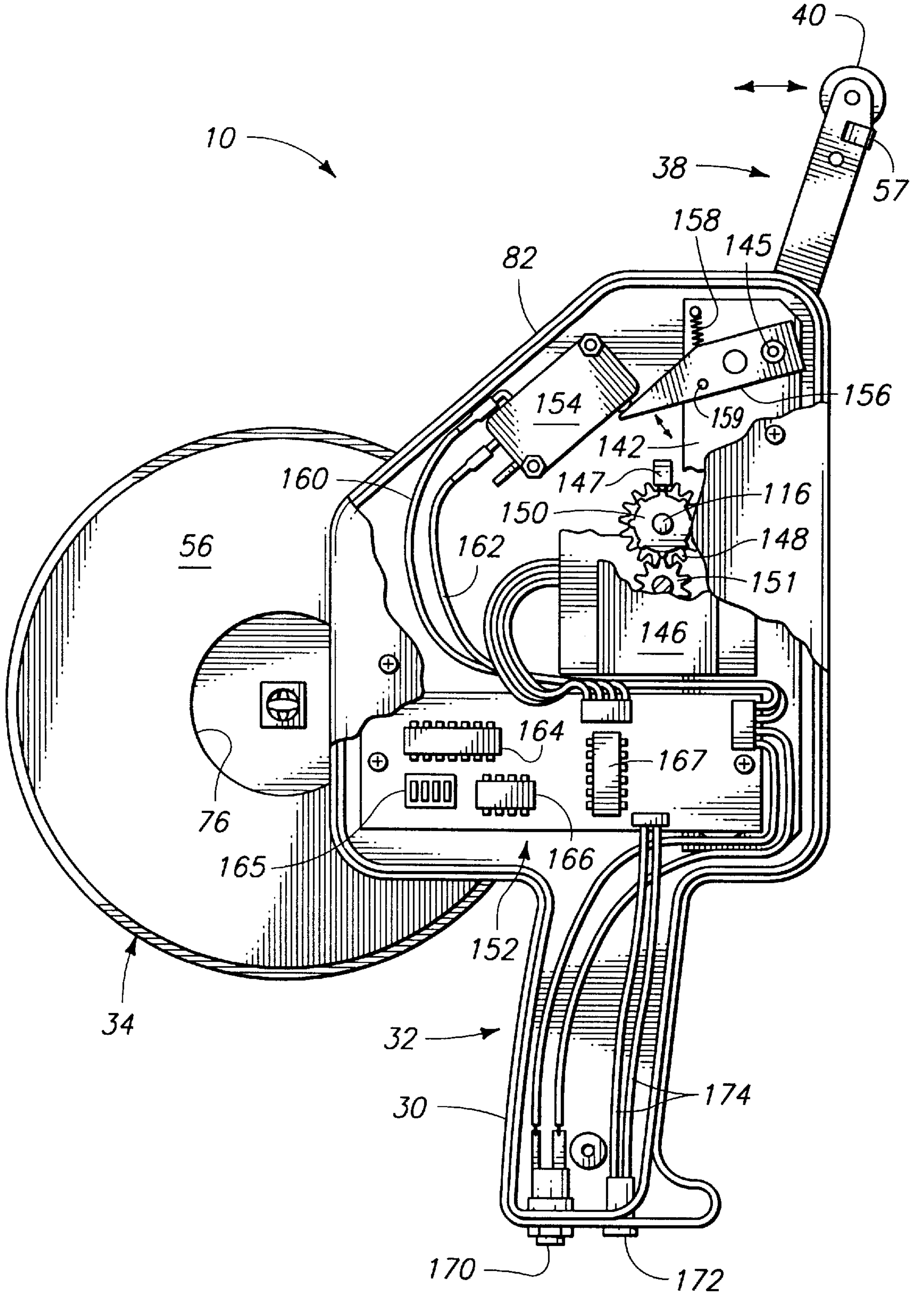
FIG. 4 is an elevational, partial breakaway view with most of the back case removed taken along the back side of the electronic hand-held labeller depicted in FIG. 3, and illustrating the various electronic and electromechanical system components utilized to selectively and configurably meter delivery of labels via the mechanical components depicted in FIG. 3.

Drive roll 44 is accurately driven for rotation by a stepper motor (not shown) housed internally of housing 32 to precisely deliver labels 12 to articles 14. The stepper motor, illustrated in FIG. 4, provides a relatively low-cost drive mechanism, while a feedback control system, described below, ensures precise advancement of web 42 so as to present individual labels 12 for delivery. Take-up roll 46 is driven for co-rotation with drive roll 44 by way of a flexible, elastic drive band 48 that is mounted under tension therebetween to provide frictional engagement and co-rotation.

As illustrated in further detail with respect to FIG. 2, hand-held labeller 10 is carried by an operator 43 who manipulates the placement of labeller 10 into an aligned position with individual articles 14. According to one mode of operation, operator 43 downwardly moves labeller 10 into engagement with each individual article 14 such that peel plate assembly 38 causes touch activation of an internal switch in response to assembly 38 being biased upwardly a small amount. According to this mode of operation, an operator 43 lowers labeller 10 such that application roller 40 contacts articles 14 and applies a label 12. Label 12 is pre-positioned for application and separation from along web 42.

As shown in FIG. 2, power supply 226 comprises an alternating current (AC) power supply having a coiled power cord 222 and a threaded, removable connector 224 configured to removably mate with handle 30. Power supply 226 is illustrated in mated engagement with a standard household 120-volt AC power supply, illustrated as outlet plug 35. One suitable power supply 226 is manufactured by Cell-Con, Incorporated, 735 Fox Chase, Coatesville, Pa. 19320. Such power supply 226 is sold under Model No. 95839 JN8. Accordingly, an input of 120 volts AC (VAC), at 60 Hz, is utilized. Regulated outputs are provided by such power supply 226 as a power supply of 18 volts DC (VDC) at 50 milliamps, and a NICAD charger output of 20.2 volts DC (VDC) at 160 milliamps). Utilization of such power supply 226 enables charging of rechargeable batteries that are placed within handle 30. Alternatively, labeller 10 can be directly operated via power supply 226.

Peel plate assembly 38 moves up and down along an engagement path 51 via a small amount of pivotal movement in response to roller 40 engaging individual articles 14. Upon contact and pivotal movement via engagement path 51, an operator draws labeller 10 along a labeller application path 53, causing application roller 40 to roll with pressure along article 14 which positively seats and adheres label 12 to article 14. An operator 43 raises labeller 10 by drawing it away from a labelled article 14 following application of a label 14 to an article. Disengagement of roller 40 from an article rotates peel plate assembly 38 downwardly which releases an internal switch via downward return of peel plate assembly 38. Such switch release causes indexed advancement, web separation, and delivery of a new label to roller 40 via precise rotation of drive roll 44.

According to another mode of operation for labeller 10 of FIG. 2, an operator 43 can apply labels 12 by positioning labeller 10 in the line of path of a tray 16 or articles, such as apples 14. Tray 16 is delivered along a support surface such as a conveyor 54. Since peel plate assembly 38 is normally biased into a downward position by a biasing spring (not shown) in the position illustrated in FIG. 2, movement of labeller 10 along rows of tray 16 causes roller 40 to contact with each article 14 which generates an upward movement along engagement path 51. Such upward movement acts against the forces imparted by the spring, with the operator 43 dragging labeller 10 along labeller application path 53. Accordingly, peel plate assembly 38 is spring-biased to a downward position between articles 14 and is upwardly-biased due to contact with individual articles 14. Such movement occurs along engagement path 51 while applying individual labels 12 successively to each article 14 contained within a row (such as rows 18–21 as shown in FIG. 1).

In order to ensure accurate and repeatable separation of labels 12 from carrier web 42, carrier web 42 is drawn from reel 36 via feed tension that is applied to web 42 with drive roll 44. Carrier web 42 is unrolled from reel 36, exits canister 34, and is received under a relatively and substantially chemically non-reactive, low-friction Teflon™, or polytetrafluoroethylene, guide roller 86 of peel plate assembly 38. Teflon™ guide roller 86 is positioned proximate application roller 40, with carrier web 42 being doubled over along a sharp edge of peel plate 50, provided on peel plate assembly 38. Sharp doubling back of carrier web 42 adjacent to application roller 40 causes labels 12 to be separated from web 42 and delivered onto a label retainer shelf 57 and under roller 40.

Labels 14 are supported on label retainer shelf 57 after being separated from web 42. In this supported position, labels 14 extend under application roller 40. Positioning of roller 40 into contact with an article 14 causes such supported labels 14 to be adhesively engaged with such article 14. Hence, shelf 57 and roller 40 cooperate to ensure successful application of labels 12 onto articles 14.

As shown in FIG. 2, peel plate assembly 38 is pivotally supported from housing 32 by way of a pivot pin 88 so as to provide for a limited amount of pivotal movement of application roller 40 along engagement path 51. A peel plate in-feed idler roller 45 is positioned immediately adjacent indexed drive roll 44. As a result, carrier web 42 is passed along a bottom of peel plate 50 after application of a label 12 therefrom, and around idler roller 45 where it is delivered to a radial outer surface of drive roll 44.

Drive roll 44 is driven in rotation by a motor contained within housing 32 which causes idler roller 45 to co-rotate as carrier web 42 is delivered therebetween. Carrier web 42, in conjunction with labels carried thereon, is carefully and accurately delivered by drive roll 44 via interdigitating pins 52 provided on the outer surface of drive roll 44. Pins 52 are received in indexed engagement within holes 55 of carrier web 42 (see FIG. 3). Accordingly, drive roll 44 is accurately driven to impart precise presentment of labels 12 in an indexed manner along peel plate assembly 38 for application to articles 14.

Accurate, indexed delivery and separation of labels 12 from carrier web 42 is imparted by controllably rotating drive roll 44 a predetermined amount via a motor contained within housing 32 as shown in FIG. 2. A total of eight drive pins 52 are provided in equally spaced-apart relation along a radial outer surface of drive roll 44. However, any other suitable number of drive pins can be provide. At least several of pins 52 engage in interdigitating relation with carrier web 42 where web 42 engages along roll 44. Pins 52 engage with web 42 downstream of application roller 40 which imparts tension along web 42 sufficient to unroll web 42 from reel 36 and feed such web 42 through peel plate assembly 38.

Movement of peel plate assembly 38 upwardly along path 51 in response to engagement with an article 14 during label application is detected by a sensor such as a contact switch 154 (see FIG. 4). Indexed rotation of drive roll 44 is imparted following release of such switch concurrent with disengagement of roller 40 with an article 14. Such rotation causes delivery of another label 12 beneath application roller 40 for presentment to the next article 14 being labelled.

As shown in FIG. 2, waste take-up roll 46 is driven for co-rotation with indexed drive roll 44 via drive band 48. Drive band 48 is formed from an elastic o-ring that is stretched and frictionally coupled with drive roll 44 and a drive body 100 (see FIG. 3) on waste take-up roll 46. A contact diameter provided on roll 44 and drive body 100 is sized such that roll 46 is driven in rotation sufficiently to provide a radial outer surface travel distance on take-up roll 92 that is greater than the travel distance imparted to web 42 by drive roll 44. In this manner, tension is constantly applied to web 42. To prevent tearing of web 42, a friction clutch is provided between take-up body 92 on roll 46 and drive band 48 via a pair of Belleville washers 90 (see FIG. 3).

More particularly, as shown in FIG. 3 cylindrical take-up body 92 on take-up roll 46 contains a slot 94 into which an end portion of carrier web 42 is inserted. Rotation of cylindrical body 92 is imparted via a frictional clutch on take-up roll 46 which rotates take-up reel 92 sufficiently to tension and wrap a scrap portion 47 of web 42 thereabout under tension. Hence, positive retention of carrier web 42 is ensured between drive roll 44 and take-up roll 46 due to a slightly greater drive displacement being imparted to take-up roll 46. Such slippage of take-up reel 92 about a drive body 100 occurs when web 42 is placed under tension. A radial outer surface delivery speed of reel 92 matches the surface delivery speed of drive roll 44 due to slippage of the frictional-clutch feature caused by tension on web 42. Hence, carrier web 42 remains under tension and does not tear since excess tension is prevented from being applied between drive roll 44 and take-up reel 92.

In assembly, a pair of Belleville washers 90 are compressed between an enlarged portion of drive body 100, about drive groove 102, and take-up body 92. Threaded fastener 98 cooperates with washer 96 to retain take-up body 92 in compressed relation with washer 90 and drive body 100. Fastener 98 is configured to mate in threaded engagement with a threaded female bore 101 formed in an end of drive body 100. Optionally, washer 90 can be eliminated and a frictional fit can be provided between reel 92 and a central shaft 113 of drive body 100.

FIG. 3 illustrates in even greater detail the various mechanical components of hand-held labeller 10 in an exploded perspective view. More particularly, the particular construction details for components such as housing 32, peel plate assembly 38, label reel support canister 34, waste take-up roll 46 and indexed drive roll 44 are illustrated in greater detail.

As shown in FIG. 3, housing 32 is formed from injection-molded plastic material from a two-piece construction including right and left shells 80 and 82. Shells 80 and 82 join together along mating edge portions 81 and 83, respectively, where they are retained together by a plurality of space-apart threaded fasteners 85. According to one construction, shells 80 and 82 are each formed from separate unitary pieces of injection-molded plastic such as a copolymer of acrylonitrile-butadiene-styrene (ABS). Various alternative constructions are also possible, including the use of fiber-enforced plastics, metal, or other suitable materials. Even further, housing 32 can be constructed from a number of separate pieces that are assembled together with fasteners, adhesives or welds.

Also according to the construction depicted in FIG. 3, handle 30 is integrally formed from right and left shells 80 and 82 of housing 32. A finger indent 84 is also formed in right shell 80 at a location that is optimal for receiving a user's index finger. Such a location for a finger indent 84 enables a user's hand to grip labeller 10 with greater torsional rigidity when grasping handle 30 via housing 32. Such an ergonomic feature is particularly desirable for users who must hand apply labels for a long period of time. Furthermore, such finger indent 84 imparts greater control over the precise positioning of application roller 40 when hand manipulating the positioning of labeller 10.

The construction of label reel support canister 34 is also readily illustrated in FIG. 3. More particularly, canister 34 is formed from a canister body 56 of thermo-formable plastic material such as ABS. Canister 34 also includes a canister cover 58 that removably mates with body 56 along a cylindrical end portion 76 and rim 78 of body 56. Cover 58 includes a rotatable fastener 68 which is trapped for rotation within an aperture 70 of cover 58 by a lock washer 66. One such fastener 68 and washer 66 are produced by Southco. Fastener 68, rotatable supported with respect to cover 58, is then mated within an aperture 62 of body 56 and a receiving nut 64. Nut 64 is provided in the back side of aperture 62 such that rotation of fastener 68 provides for rotatable engagement and release of cover 58 from body 56. In this manner, a label reel 36 can be easily loaded/unloaded from within a complementary receiving recess 69 of body 56 by removal of cover 58. Cover 58 is removed by simple rotatable finger manipulation of fastener 68 which is possible without the use of any tools.

Also according to FIG. 3, canister body 56 is formed from a unitary piece of injection-molded plastic material that can be molded from a copolymer of acrylonitrile-butadiene-styrene (ABS). Such an injection-molded plastic construction for canister body 56 is similar to that used in forming housing 32. It is also understood that the various alternative constructions for housing 32 can be implemented when forming body 56. Body 56 is then secured to an adjacent, outer surface of left shell 82 by way of an adhesive, glue, or a plurality of fasteners. Body 56 is formed substantially from a thin sheet of plastic material which has been heated and vacuum formed in a thermo-forming process so as to form a central hub 60 within recess 69. Hub 60 is proportioned to receive a cylindrical carrier 72 that is formed centrally of label reel 36 such that label reel 36 rotates about hub 60 and within recess 69 as delivery tension is applied to carrier web 42 by drive roll 44. Carrier web 42 and labels 12 are delivered through an aperture, or window, 74 provided along a radial outer portion of canister body 56. Aperture 74 is located such that carrier web 42 and labels 12 are drawn out of canister 34 and delivered around guide roller 86 of peel plate assembly 38 to apply labels to articles. Body 56 can be sized to accommodate various width webs and labels.

Drive roll 44 is carried for rotation on the outside of housing 32 by a drive shaft 116 fitted through an aperture 128 of roll 44 as shown in FIG. 3. Shaft 116 and drive roll 44 are driven in rotation by a drive motor (not shown) contained inside housing 32. Shaft 116 extends through an aperture in left shell 82. A threaded fastener, or set screw, 114 is received through a threaded radially extending aperture 121 of drive roll 44 and into engagement with shaft 116. Accordingly, drive roll 44 is fixedly mounted onto shaft 116 by threadingly securing set screw 114 through roll 44 and into shaft 116 such that drive roll 44 is secured for rotation onto shaft 116. Hence, drive roll 44 and shaft 116 are driven for rotation by a motor contained within housing 32 to advance web-supported labels or articles to peel plate assembly 38.

Drive roll 44 is formed with a circumferential outer surface 106 containing a plurality of circumferentially and equally spaced-apart apertures 112. Each aperture 112 receives an associated drive pin 52 therein such that an array of drive pins 52 are positioned to extend radially outwardly of surface 106. In this arrangement, pins 52 are configured to engage with correspondingly spaced-apart holes 55 formed within carrier web 42, as web 42 is supported against drive roll 44. Drive roll 44 also contains a radially inwardly extending circumferential groove 104 along an outer periphery or surface 106. Groove 104 is sized to receive drive band 48 under tension and in frictional engagement, such that, in assembly, drive band 48 remains flush below outer surface 106. Furthermore, a radially inwardly extending circumferential recess 108 is provided along surface 106 of roll 44, between groove 104 and housing 32.

Recess 108 forms a groove sized to receive a radially outwardly extending flange 122 of idler roller 45. Recess 108 functions to trap idler roller 45 for rotatable movement on a stationary shaft 118 extending from housing 32. In this manner, idler roller 45 is retained for rotation on shaft 118 simply by the coaction of flange 122 with recess 108. In another implementation, shaft 118 rotates with idler roller 45. Hence, fastener 114 serves to retain both drive roll 44 and idler roller 45 onto housing 32. Such construction reduces the number of parts, which reduces the overall cost.

Drive roll 44, as shown in FIG. 3, contains a central lightening recess 110 arranged radially inward of contact surface 106 and away from housing 32. Recess 110 serves to lighten roll 44. Optionally, any of a number of configurations for one or more lightening holes can be used to reduce the weight of roll 44, while maintaining sufficient strength to deliver web 42.

As shown in FIG. 3, waste take-up roll 46 is formed from a plurality of components that are assembled together by a threaded fastener 98. Fastener 98 is received through a washer 96, a central aperture of take-up body 92, and into a complementary threaded aperture 101 of drive body 100. A central shaft 113 of drive body 100 receives take-up body 92 and a pair of opposed Belleville washers (or springs) 90. At an opposite end, central shaft 113 enters housing 82 where waste take-up roll 46 is supported for rotation in a bronze bushing (not shown). Roll 46 is supported for rotation within shell 82 by rotatably mounting roll 46 in such bushing contained on a base plate 142 (see FIG. 4). Shaft 113 extends through such bushing, and a stopper collar 117 is secured thereon via a threaded set screw 119 and a threaded aperture 121. Accordingly, roll 46 is fixedly secured for rotation onto such base plate.

Take-up roll 46 contains a cylindrical drive body 100 that is rotatably carried by housing 32 and is driven for rotation by drive band 48. Drive band 48 is received under tension within a circumferential groove 102 of body 100. Drive band 48 is formed substantially from an O-ring shaped piece of elastic, synthetic rubber material configured to frictionally engage within grooves 102 and 104. Take-up roll 46 further includes a retaining washer 96, which cooperates with fastener 98 to rotatably guide and support cylindrical take-up body 92.

Cylindrical take-up body 92 is driven in rotation by drive body 100 via contact friction with a pair of Belleville washers 90 that are compressed together in assembly between drive body 100 and take-up body 92. Belleville washers 90 drive body 92 in rotation with drive body 100, and form a frictionable clutch that allows for slippage between body 92 and drive body 100 when sufficient tension is applied to web 42.

More particularly, groove 102 is sized with a diameter relative to a diameter for groove 104 so as to impart greater radial outer surface displacement to an outer surface of take-up body 92 than to contact surface 106 of drive roll 44. Such a configuration maintains tension along carrier web 42 between drive roll 44 and take-up body 92. However, Belleville washers 90 are configured in assembly under compression to impart slippage between bodies 92 and 100 before tension on carrier web 42 becomes great enough to tear web 42. Hence, the waste take-up roll provides a clutch that prevents over-drive to web 42 by take-up body 92.

Prior to use, a label reel 36 is loaded into canister body 56 and a free end is fed through opening 74, loaded through peel plate assembly 38, engaged around drive roll 44, and loaded onto take-up roll 46. A leading, free end of carrier web 42 is loaded into a slot 94 of take-up body 92, trapping the carrier web 42 therein. Carrier web 42 is then collected around take-up body 92 as body 92 is driven in rotation. Such scrap carrier web 42 is stowed in a roll around take-up roll 46 for later removal and disposal.

Each Belleville washer 90 comprises a model R6 Belleville washer, or spring. Optionally, other types of fasteners or springs can be used to impart friction between bodies 92 and 100. Such Belleville washers are assembled together in opposed directions such that the radial outer edges remain nested together.

FIG. 3 also illustrates in exploded perspective view the construction of peel plate assembly 38. In operation, peel plate assembly 38 cooperates with drive roll 44 to form a label delivery mechanism 59. More particularly, peel plate assembly 38 comprises a peel plate 50, an application roller 40, a guide roller 86, a Teflon™ peel plate insert piece 49, and a delivery shelf 57. Peel plate 50 is supported on housing 32 for limited pivotal movement via a pivotable shaft 145 and a threaded fastener 88. Application roller 40 is rotatably carried by peel plate 50 via a Delrin™ pin, or dowel, 139 that is received in peel plate 50. Teflon™ guide roller 86 is rotatably carried by peel plate 50 via another steel pin 140 that is press-fit into peel plate 50. Additionally, delivery shelf 57 is rotatably carried by peel plate 50 via a steel pivot pin 61 that is press-fit into peel plate 50.

Figure 7:
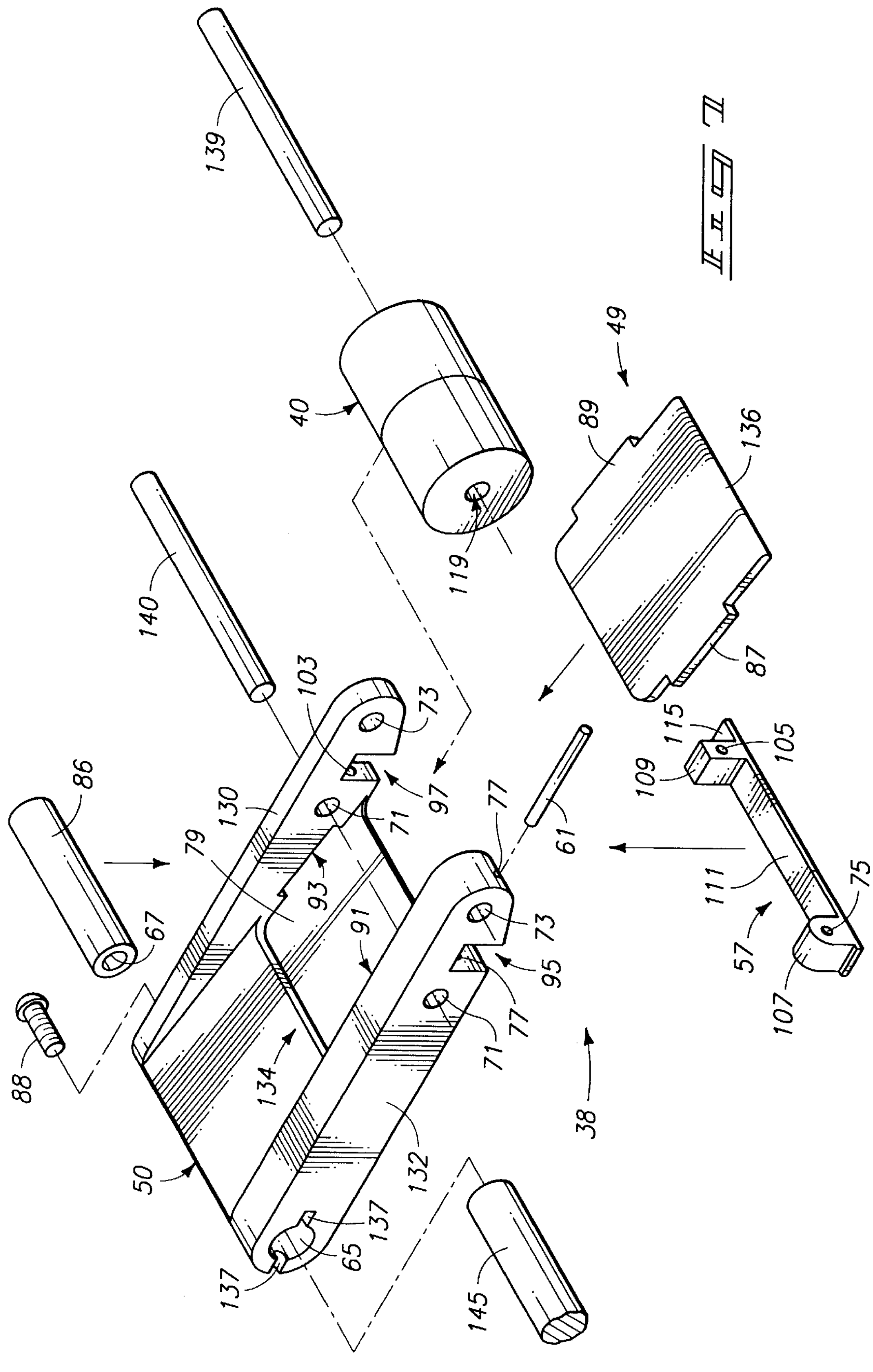
FIG. 7 is an exploded perspective view of the peel plate assembly depicted in FIGS. 1–6.

Peel plate 50 is formed from a unitary piece of relatively inexpensive plastic material as shown in FIGS. 3 and 7. One suitable material comprises a unitary piece of Delrin™ that is shaped by machining. Another suitable material comprises a piece of injection molded ABS plastic. Peel plate 50 is configured to support a smaller piece of relatively expensive and substantially chemically inert (to adhesive) low-friction material such as Teflon™ comprising insert piece 49. Such insert piece 49 imparts a slippery and chemically inert surface that reduces gumming-up and label adherence during delivery of labels from a web. In this manner, peel plate 50 can be constructed more economically by limiting the use of expensive materials to only insert piece 49 while at the same time providing a desirable slippery surface that reduces or eliminates gum-up problems frequently encountered during label delivery.

As shown in FIG. 3, delivery shelf 57 is pivotally carried on peel plate assembly 38 to enable easy loading and unloading of carrier web 42 and labels 12 through peel plate assembly 38. More particularly, delivery shelf 57 is opened by pivoting shelf 57 away from peel plate 50 during loading and unloading operations. Following loading or unloading, delivery shelf 57 is pivoted back into a locked, or closed, position with peel plate 50. Accordingly, carrier web 42 is received about application, or delivery, edge 136 and between shelf 57 and a bottom surface of peel plate 50. Peel plate 57 serves to ensure a sharp, doubling back of web 42 about application edge 136. Such co-action enhances the folding of web 42 and the release of labels 12 from such web onto shelf 57.

Figure 5:
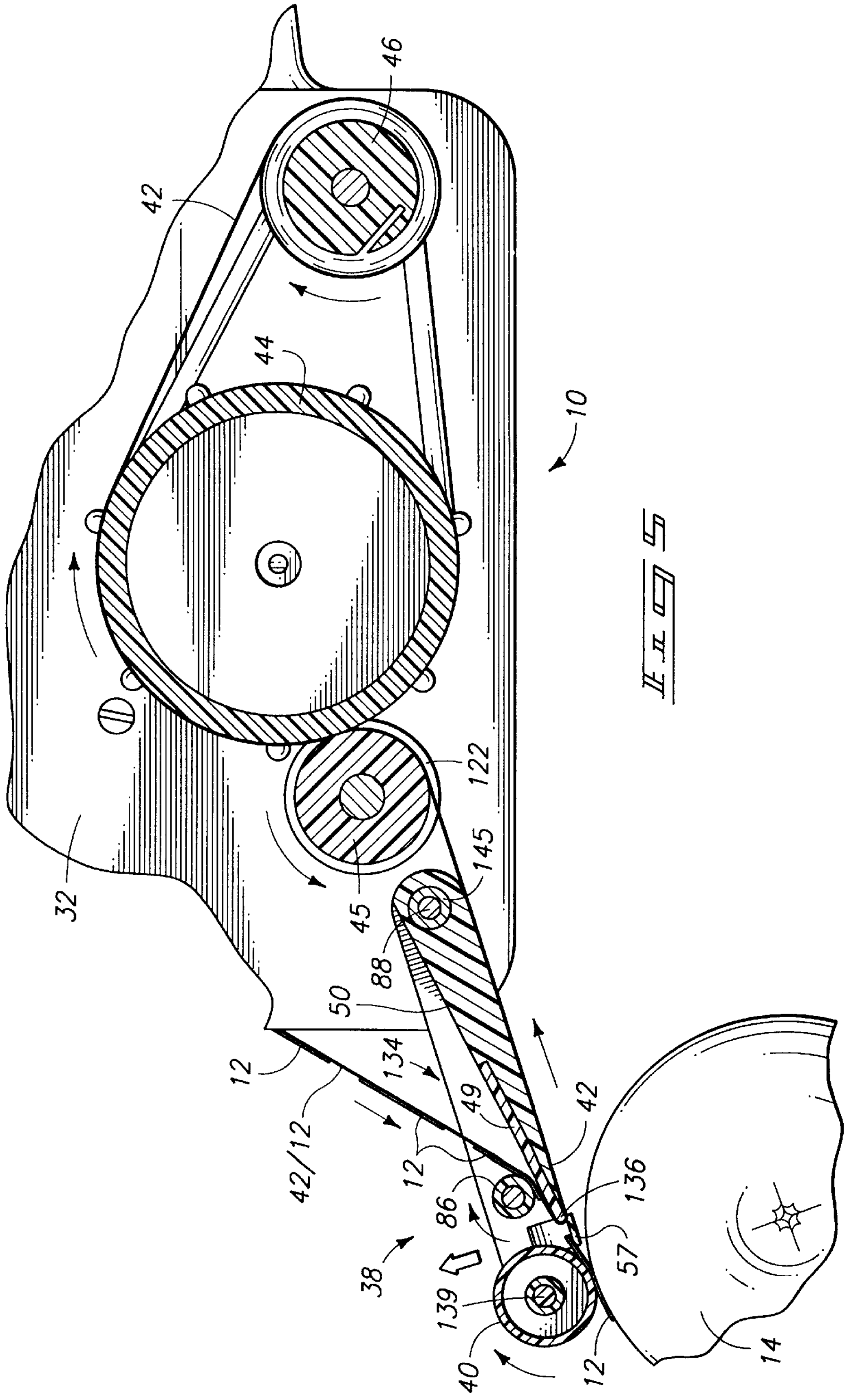
FIG. 5 is an enlarged center line sectional view of the peel plate and drive roll components of the hand-held labeller of this invention taken along line 5—5 of FIG. 3 illustrating delivery of the labels and a carrier web through the drive roll, peel plate, and on to the carrier web waste take-up roll.

As shown in FIG. 5, delivery shelf 57 also prevents labels 12 from traveling around application edge 136. Sufficient clearance is provided between peel plate 50 and shelf 57 only for passage of carrier web 42. Hence, potential gumming-up of idler wheel 45 and drive wheel 44 with labels 12 is prevented.

Peel plate assembly 38 includes peel plate 50 which is configured to form a pair of substantially parallel and opposed side walls 130 and 132 as shown in FIGS. 3 and 7. Side walls 130 and 132 extend on either side of a central delivery slot 134 as shown in FIG. 7. Slot 134 extends longitudinally of peel plate 50, with insert piece 49 being received in snap-fit engagement between side walls 130 and 132, along a leading edge of delivery slot 134. Slot 134 and insert piece 49 are sized in width sufficiently to guide carrier web 42 and labels 12 beneath Teflon™ guide roller 86 and to a delivery edge 136 formed by insert piece 49. Delivery edge 136 is provided immediately before and adjacent to label application roller 40, with label shelf 57 being positioned immediately beneath delivery edge 136 when pivoted to a closed, or loaded position.

As shown in FIG. 7, Teflon™ insert piece 49 forms a low friction surface on peel plate 50. Hence, it is not necessary to form peel plate 50 from Teflon™ or some other relatively high-cost, low-friction material in order to provide a label delivery mechanism having a low-friction, anti-gumming (from label adhesive) delivery surface. Hence, a significant cost savings is achieved. Particularly, insert piece 49 reduces friction along central delivery slot 134, between guide roller 86 and delivery edge 136. Such location is where most friction is encountered as a web and labels are delivered between guide roller 86 and insert piece 49, and as a web is folded over delivery, or application, edge 136 to separate labels therefrom.

As shown in FIG. 7, insert piece 49 is secured to peel plate 50 by engaging a pair of laterally extending tabs, or wings 87 and 89 on insert piece 49 into mating slots 91 and 93 provided in side walls 132 and 130, respectively. A recess 79 is provided in peel plate 50 having a size that corresponds with the outline of insert piece 49 such that insert piece 49 is engaged with peel plate 50 to present a flush surface extending along delivery slot 134. Once loaded onto peel plate 50, insert piece 49 forms the leading, or delivery edge 136 on peel plate 50. One technique for loading insert piece 49 onto peel plate 50 entails biasing wings 87 and 89 by squeezing one toward another, causing insert piece 49 to bow as the distance between wings 87 and 89 decreases sufficiently to load each wing into each slot 91 and 93, respectively. Optionally, insert piece 49 can be in-place molded into peel plate 50. Even further optionally, peel plate 50 can be constructed entirely from a single piece of low-friction material. Yet even further, the alternative constructions depicted in FIGS. 18 and 19 can be used.

As shown in FIG. 7, label carrier 57 is formed from a single piece of material such as Delrin™ or Teflon™ coated aluminum. Other materials that resist adherence of label adhesive can also be used to construct label carrier 57. Label carrier 57 forms a rotatable finger element 107, a clasping finger element 109 and a planar label shelf surface 111. A steel pivot pin 61 is press-fit into an aperture 77 that is formed in side wall 132 of peel plate 50, extending from each side of a slot 95. An aperture 75, sized slightly larger than pin 61, is provided in rotatable finger element 107 for pivotally supporting shelf 57 from peel plate 57. Elements 107 and 109 each form a pin or member configured to mate with peel plate 50. A pair of bumps or nipples 103 are provided on each side of clasp finger element 109 for forcibly engaging within complementary dimples formed within a slot 97. Slot 97 forms a receiving port or female latch configured to releasably engage with finger element 109. A finger 115 on shelf 57 facilitates opening and closing by a user. Accordingly, shelf 57 can be opened and closed relative to peel plate 50 by demating and mating finger element 109 from within slot 97.

Figure 6:
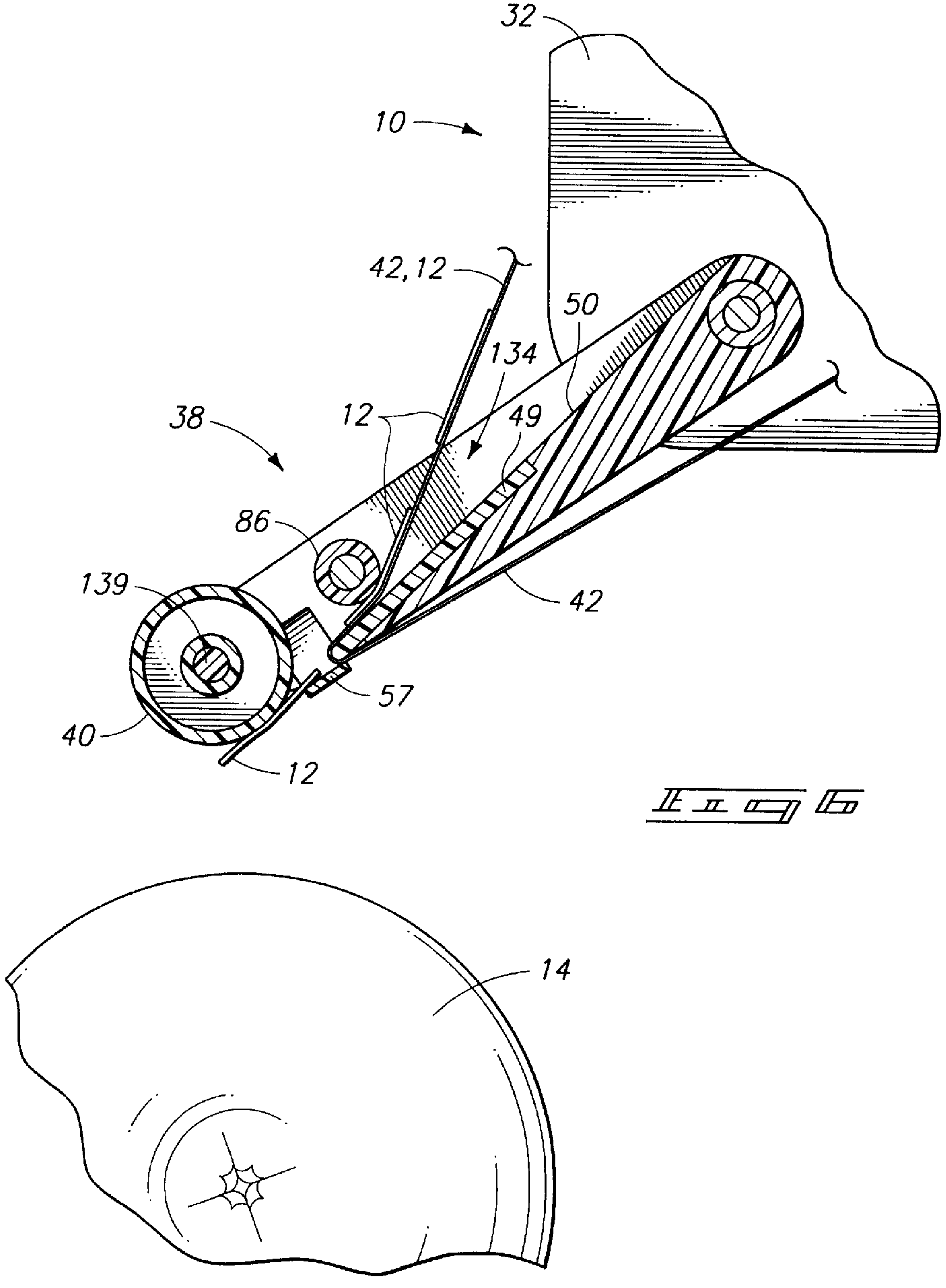
FIG. 6 is an enlarged center line sectional view of the peel plate and drive roll components of the hand labeller corresponding to the view of FIG. 5, but illustrating the peel plate immediately prior to delivery of a label to an article.

As shown in FIGS. 4 and 5, shelf 57 is positioned, when closed, to extend immediately adjacent to and slightly beneath delivery edge 136. Accordingly, during delivery of labels 12 on web 42, individual labels 12 are delivered from web 42 where they are completely separated from web 42 and are supported on shelf 57, beneath roller 40. Typically, a label is supported by an edge on shelf 57 as seen in FIGS. 5 and 6. The stepping drive motor 146 (see FIG. 4) advances web 42 sufficiently to deliver an individual label 12 onto shelf 57 in response to detected disengagement of peel plate assembly 38 from an article. Disengagement of peel plate assembly 38 occurs when a user raises labeller 10 away from an article 14 after applying a label, or an article clears from beneath the path of assembly 38. Disengagement of peel plate assembly 38 with an article 14 is detected via release of switch 154 (of FIG. 4) which is set during such engagement. Accordingly, a new label is delivered onto shelf 57 via implementation of the circuitry of FIG. 8 and software implemented according to the flowchart of FIGS. 9–13, as shown in FIG. 6.

As shown in FIGS. 5 and 6, roller 86 is positioned for rotation on peel plate 50 to provide a 10–15/1,000ths of an inch gap with the top of insert piece 49. Accordingly, such gap in the bottom of slot 134, between guide roller 86 and insert piece 49 enables labels 12 on carrier web 42 to fit therebetween in close proximity therewith. Provision of such close clearance fit ensures that labels 12 and web 42 remain in the bottom of slot 134 adjacent delivery edge 136. Such construction prevents lifting of carrier web 42 from insert piece 49 before it is bent over delivery edge 136. Such a configuration has been found to enhance label delivery to articles 14 by way of shelf 57 and application roller 40. As a result, carrier web 42 is bent or doubled over nearly onto itself along delivery edge 136. Furthermore, shelf 57 further ensures sharp folding of the web about application edge 136, which enhances label separation therefrom.

According to one construction, application roller 40 comprises a hollow silicone rubber balloon roller as shown in FIGS. 5 and 6. Such roller 40 is formed from two pieces of resilient silicone rubber material that are joined together along a seam that extends along a plane perpendicular to the axis of rotation of roller 40 at a central location. A central aperture 119 (see FIG. 7) of roller 40 receives a Delrin pin 139 such that roller 40 is carried for rotation by pin 139 within apertures 73 of peel plate 50. Pin 139 can be molded in place within roller 40. Side walls 130 and 132 are urged apart sufficiently for pin 139 and roller 40 to be loaded therein during assembly. Apertures 73 are sized such that pin 139 and roller 40 freely rotate therein. Optionally, pin 139 can be formed from a steel pin that is press-fit into peel plate 50 at each end within aperture 73, with roller 40 rotating about pin 139. Further optionally, roller 40 can be formed from a piece of resilient foam material. However, such foam material has been found to absorb fluid materials and adhesives.

Accordingly, roller 40 provides a resilient balloon roller similar to a tire or inner tube having sufficient flexibility to enable roller 40 to conform to curved surfaces when applying labels thereto. For example, the balloon construction for roller 40 is desirable when applying labels to apples, fruit or vegetables. In operation, roller 40 applies relatively even pressure to a label 12 during delivery to an article as a result of such compliance. Hence positive application of labels is ensured thereon.

Guide roller 86 and delivery edge 136 are located sufficiently adjacent to one another to allow passage of carrier web 42 and a single thickness of labels 12 between guide roller 86 and insert piece 49. Application roller 40 is positioned adjacent shelf 57 such that a label 12 is supported under roller 40 when a trailing edge of the label is positioned on shelf 57. As shown in FIG. 5, drive roll 44 is driven sufficiently to remove a label 12 from web 42, with any downstream labels serving to further urge the delivered label 12 onto shelf 57 and off web 42 since there is only room for a single thickness of one label 12 and web 42.

As shown in FIG. 7, guide roller 86 is mounted between side walls 130 and 132 of peel plate 50 by press-fitting a steel pin 140 through apertures 71, respectively. Pin 140 is received within an aperture 67 extending centrally through roller 86 and sized to provide for rotation of roller 86 about pin 140 in assembly.

As shown in FIGS. 5–7, guide roller 86 is positioned sufficiently close to application roller 40 to prevent lifting up of a web and labels from insert piece 49 of peel plate 50. Such lifting up might otherwise occur as a result of bending or doubling carrier web 42 over delivery edge 136. Such bending of web 42 over delivery edge 136 causes labels 12 adhered thereon to separate from carrier web 42. Separated labels 12 are then supported on shelf 57 along an edge of surface 111 (see FIG. 7), and underneath application roller 40 for delivery to an article when roller 40 is brought into contact therewith. Such label is applied to an article as roller 40 is compliantly and compressively engaged with a surface of an article to be labelled. Application of a leading edge of a label causes a trailing edge of such label to slide off of shelf 57 such that roller 40 rolls over the label to apply such label fully to the article. Hence, roller 40 rotatably and compressively operates to press a separated label 12 onto an article as roller 40 is moved or dragged across an article that is being labelled.

As shown in FIG. 3, peel plate assembly 38 is pivotally carried alongside housing 32 via threaded fastener 88. Fastener 88 is inserted through an aperture 99 in peel plate 50 and threaded into threaded aperture 141 in shaft 145. Shaft 145 is supported by housing 32 for limited pivotal movement as will be discussed below. Shaft 145 exits housing 32 through a bronze bushing 143 that is supported on a base plate 142 (see FIG. 4) within housing 32. A drive pin 144 is received transversely through shaft 145 via a hole (not shown) extending through shaft 145, adjacent bushing 143 and outside of housing 32. Pin 144 prevents shaft 145 from slipping inside of housing 32. Additionally, an actuator arm 156 (see FIG. 4) mounted on shaft 145, within housing 32, cooperates with pin 144 to trap shaft 145 for pivotable movement within bushing 143. Optionally, such pin 144 can be eliminated according to the embodiments depicted in FIGS. 18 and 19.

As shown in FIG. 7, peel plate assembly 38 is affixed to shaft 145 (see FIG. 3) such that peel plate assembly 38 and shaft 145 are fixedly secured together for rotation. More particularly, peel plate 50 contains a receiving aperture 65 sized to receive shaft 145 (see FIG. 3) therein. However, aperture 65 terminates short of extending completely through peel plate 50. Instead, a smaller aperture 99 (see FIG. 3) extends from the terminating inner end of aperture 65 to enable fastener 88 to pass from the outside of peel plate 50 and into threaded engagement within threaded aperture 141 of shaft 145. Pin 144, in assembly, is received within a complementary slot 137 within peel plate 50 such that peel plate 50 is fixedly secured onto shaft 145 for pivotal movement therewith. Optionally, any of a number of other fastener constructions can be used to pivotally support peel plate assembly 38 onto a labeller housing.

As shown in FIG. 4, shaft 145 is supported for pivotable movement within bushing 143 (of FIG. 3) so as to extend inside of housing 32. Shaft 145 and peel plate assembly 38, which are assembled together, are retained within such bushing by a stop collar (not shown) that is fitted onto shaft 145 immediately inside of the bushing. Such stop collar has a threaded fastener that enables securement onto shaft 145. Additionally an actuator arm 156 forms a lever that is secured onto the inner-most end of shaft 145. Arm 156 is secured to shaft 145 by a press-fit, brazing, heat shrink fit, or other means of securement that fix actuator arm 156 to prevent rotation relative to shaft 145. Hence, actuator arm 156 pivots with shaft 145 and peel plate assembly 38 in response to engagement of application roller 40 with an article being labelled.

According to FIG. 4, arm 156 is configured to engage with a microswitch 154 when application roller 40 is disengaged from an article. Such disengaged position is ensured via coaction of a tensioned coil spring 158 that is secured between base plate 142 and a support pin 159 mounted in arm 156. Engagement of application roller 40 with an article during a labelling operation causes peel plate assembly 38, shaft 145 and arm 156 to rotate, in a counter-clockwise direction as viewed in FIG. 4, such that arm 156 disengages from microswitch 154. Removal of application roller 40, following a labelling operation, causes spring 158 to return arm 156 into contact with microswitch 154.

According to FIG. 3, peel plate in-feed idler roller 45 includes a circumferential groove 120 adjacent to retention flange 122. Groove 120 is positioned such that, in assembly, groove 120 enables clearance of pins 52 there along. Through-hole, or aperture, 124 provides for rotatable mounting of roller 45 onto shaft 118. In assembly, a contact surface 126 of roller 45 engages an opposite side of carrier web 42 as carrier web 42 is passed between drive roll 44 and idler roller 45. Circumferential groove 120 provides for clearance of pins 52 which interfit within holes in web 42. Accordingly, contact surface 126 is mated in close, proximate engagement with surface 106, with carrier web 42 being received in engagement between surfaces 106 and 126. Idler roller 45 is designed such that aperture 124 provides for a free, rotating bearing surface about stationary pin 118 while flange 122 traps roller 45 onto shaft 188 thereabout.

FIG. 4 illustrates the electrical and electromechanical features of labeller 10 via a partial breakaway view taken from the backside of housing 32 along left shell 82. Portions of left shell 82 have been selectively removed as shown in FIG. 3. More particularly, mounting plate 142, formed from a piece of aluminum plate, is fastened within shell 82 to form a mounting structure. Mounting plate 142 provides a support structure onto which are mounted a stepper motor 146, a gear reduction system comprising intermeshing gears 148 and 151, a rotary cam 150, and a printed circuit board 152.

As shown in FIG. 4, intermeshing gears 148 and 151 are sized in proportion to stepper motor 146 so as to impart a desired operating speed and sufficient torque to drive a web containing labels via drive roll 44 (see FIG. 3). Rotary cam 150 is secured to gear 150 for rotation therewith such that a contact switch 147 accurately monitors rotatable positioning of shaft 116. Gear 151 is secured onto the drive shaft of stepper motor 146. Hence, rotary cam 150 cooperates with contact switch 147 to provide a feedback signal to controller 164 indicative of the indexed rotation imparted to drive roll 44 (see FIG. 3) via shaft 116. Accordingly, contact switch 147, comprising an Omron J-series miniature microswitch, delivers a feedback signal to microcontroller 164 via a wire (not shown). Optionally, cam 150 and switch 147 can be eliminated where sufficiently precise control can be achieved via actuation of motor 146. One suitable stepper, or stepping, motor is produced by Omron under model type 42BYGH. Other suitable stepper motors can also be used.

As described previously, contact microswitch 154 is mounted within shell 82 for detecting the rotation of actuator arm 156 corresponding to movement of peel plate assembly 38 via shaft 145. Contact switch 154 produces a signal via signal lines 160 and 162 that is delivered to printed circuit board 152 where it is detected by a microcontroller 164. Microcontroller 164 comprises a processor and memory. Additionally, a memory module 166 is also provided on printed circuit board 152. Furthermore, a female electrical connector 170 is provided in a bottom portion of handle 30, adjacent a serial connector 172. Serial connector 172 is coupled via a flex cable 174 with printed circuit board 152. Female connector 170 is configured to removably receive male connector 24 of power cable 22 (see FIG. 1).

As shown in FIG. 4, printed circuit (PC) board 152 contains several integrated circuits such as memory 166, microcontroller 164, and stepper motor driver 167. A dip switch 165 is also provided on PC board 152 to enable selective configuring of the feed distance imparted to drive roller 44 (of FIG. 3) responsive to each detected movement of peel plate assembly 38 via switch 154.

According to one construction, memory 166 comprises a 256-bit serial Electrically Erasable Programmable Read Only Memory (EEPROM). One such memory is manufactured by Fairchild Semiconductor under part number NM93C06 as a CMOS non-volatile memory. Interfacing for such EEPROM is microwire compatible for simple interface to standard microcontrollers and microprocessors.

According to one construction, microcontroller 164 comprises a 20-pin one time programmable MicroController Unit (MCU). One such microcontroller is manufactured by Motorola Semiconductors under part number MC68HC705J1A. Such microcontroller 164 includes a processor, internal memory, a timer, and an oscillator all provided on a single chip.

According to one construction, stepper motor driver 167 comprises a device driver for driving a two-phase stepper motor in a bipolar mode of operation. One such stepper motor driver 167 is manufactured by Motorola Semiconductors under part number SAA1042. Such stepper motor driver 167 contains three input stages, a logic section and two output stages. Furthermore, such stepper motor driver 167 can be configured to drive either 6.0V or 12V motors.

According to one construction, dip switch 165 comprises a Dual In-line Package (DIP) switch having a set of four toggle switches mounted directly onto a circuit board. Each switch can be flipped to an "on" or "off" position in order to set a predetermined desired drive rotation to shaft 116 and drive wheel 44, via gears 148 and 151, and motor 146. Such switch setting is used to configure a processor within microcontroller 164 that initializes stepper motor driver 167 to drive motor 146 through a predetermined amount of rotation. Accordingly, a web can be moved a desired amount to deliver a label to peel plate assembly 38 for delivery to an article.

FIG. 5 is a sectional view taken along line 5—5 of FIG. 3 illustrating the feeding of carrier web 42 and labels 12 about idler roller 45, peel plate assembly 38, drive roll 44, and waste take-up roll 46, but omitting various other details which are shown only partially in breakaway. FIG. 5 depicts upward pivotal displacement of peel plate assembly 38 resulting from contact between application roller 40 and article 14. Label 12 is dislodged from shelf 57 and applied to article 14 via rotatable action of roller 40 with an article 14. As viewed in FIG. 5, either labeller 10 is drawn in a right direction during application of label 12, or article 14 passes in a left direction under roller 40 such that roller 40 rotates in contact with label 12. Such rotatable contact applies pressure to label 12 that ensures adhesive application of label 12 to article 14. Furthermore, the hollow construction of roller 40 provides for contoured mating between roller 40 and article 14 so as to further ensure application of label 12 to article 14.

As depicted in FIG. 5, peel plate assembly 38 is rotated upwardly as roller 40 is biased into contact with article 14, depositing label 12 thereon. Such upward rotation causes shaft 145 to rotate, which rotates actuator arm 156 and closes switch 154 (see FIG. 4).

FIG. 6 is a sectional view corresponding to the view of FIG. 5, but illustrating peel plate assembly 38 immediately prior to applying a delivered label 12 to an article 14. More particularly, peel plate assembly 38 is rotated downwardly to a resting state such that shaft 145 and actuator arm 156 are disengaged from switch 154, which remains open (see FIG. 4).

FIG. 7 illustrates the various structural components used to assemble together peel plate assembly 38. Various of such components have already been described above. The assembly of shelf 57 to peel plate 50 can be readily seen. Similarly, the assembly of insert piece 49 to peel plate 50 is also clearly depicted. Pin 61 is press-fit into aperture 77 of peel plate 50 to form a pivot pin for shelf 57. A finger latch 115 on shelf 57 facilitates engagement/disengagement of finger 109 from slot 97 by a user. Hence, shelf 57 can be opened to facilitate loading/unloading of a web and labels from peel plate assembly 50.

Figure 8:
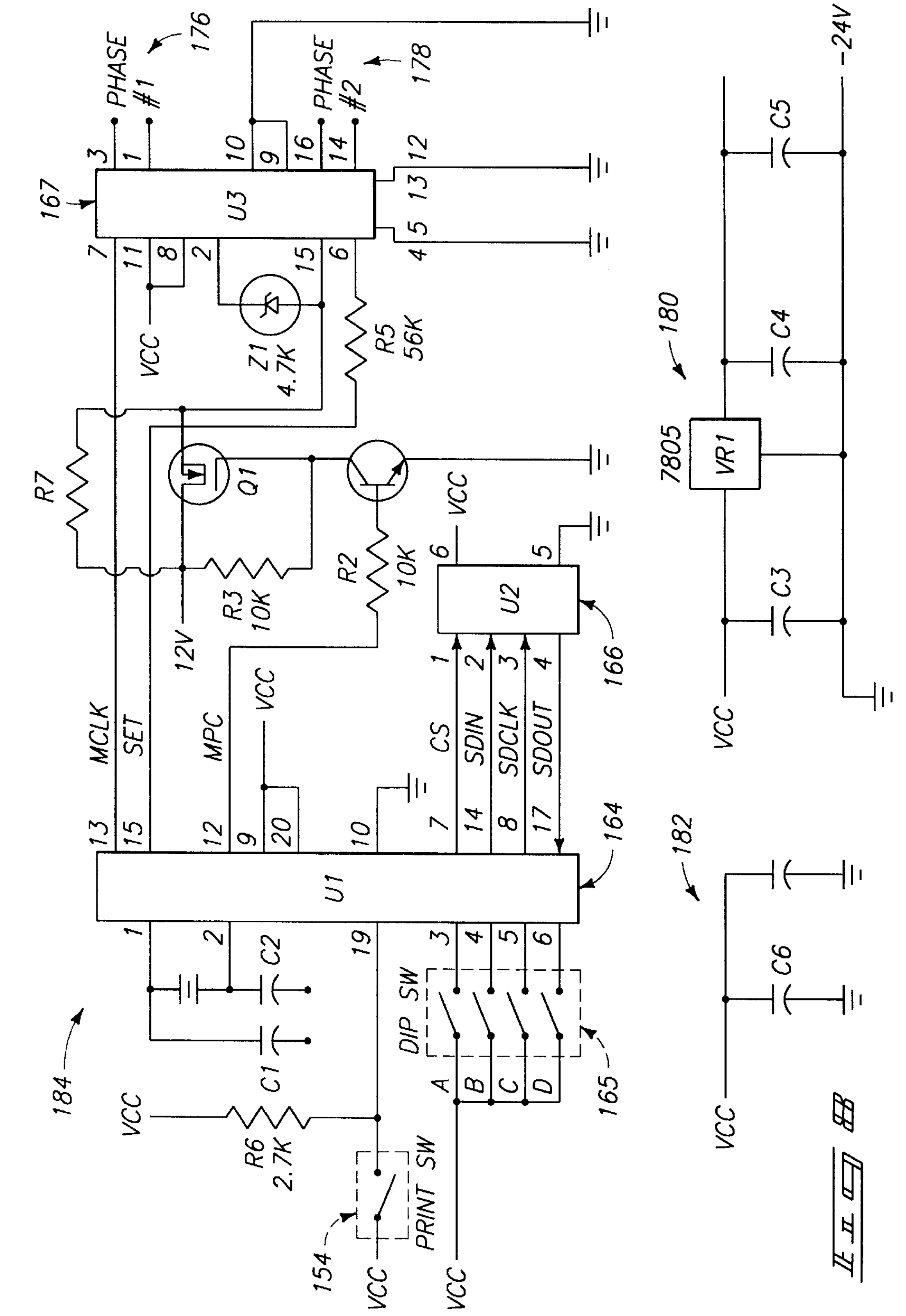
FIG. 8 is an electrical schematic diagram of the electrical system components depicted in FIG. 4.

FIG. 8 illustrates a detailed electrical schematic diagram of control electronics 184 for the labeller according to one embodiment of the invention. Control electronics 184 correspond with the layout of printed circuit (PC) board 152 (of FIG. 4). Switch 154 forms a contact switch that is closed (or set) when the application roller engages an article, and is opened (or released) when the application roller disengages an article. Switch 154 delivers an associated signal to microcontroller 164 which is used via implementation of the flowcharts depicted in FIGS. 9–16 to drive a web so as to feed labels for delivery via the labeller.

Figure 11:
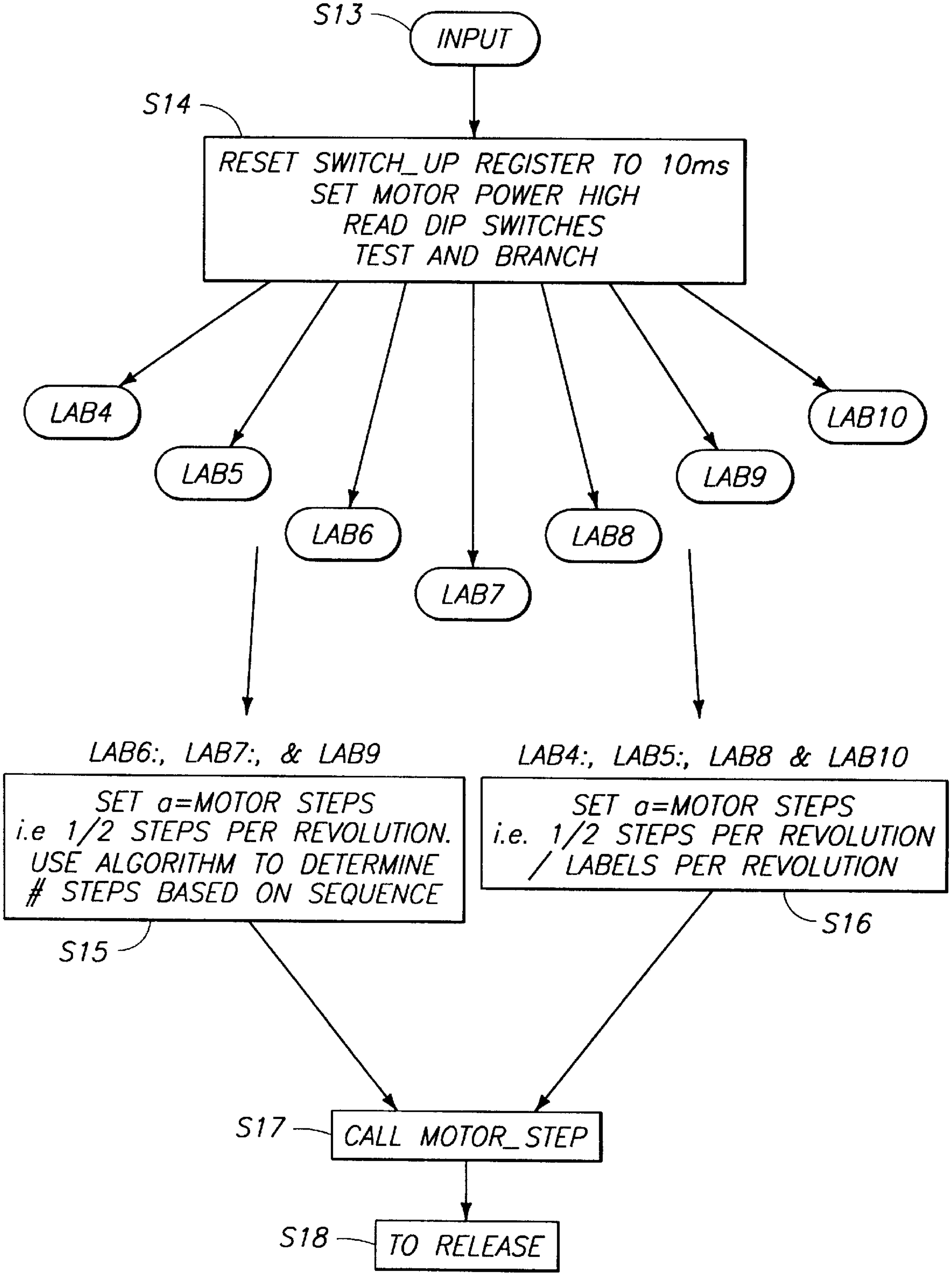
FIG. 11 is a flowchart illustrating the input and configuration of label delivery routines for one of several specific labels "x"

Dip switch 165 contains four separate on/off switches that can be selectively configured to impart a drive motor movement via two phase signals 176 and 178 through microprocessor 164 and stepper motor driver 167. The four individual switches of dip switch 165 can be set to indicate a drive displacement to be imparted to the drive roller sufficient to deliver a subsequent label. Settings for dip switch 165 correspond with the number of labels that are placed onto a web per a single motor revolution. In one implementation, such settings correspond with 4–10 labels existing per each motor revolution, as shown in FIG. 11.

Memory 166 is signal coupled with microcontroller 164 by way of a chip select signal "CS", a serial data in signal "SDIN", a serial data clock signal "SDCLK", and a serial data out signal "SDOUT". According to such implementation, memory 166 comprises EEPROM.

Stepper motor driver 167 is signal coupled via a motor clock signal "MCLK" to advance the stepper motor. Additionally, a bias level and logic set signal "SET" is signal coupled between microcontroller 164 and stepper motor driver 167. Furthermore, a motor power control signal "MPC" is signal coupled from microcontroller 164.

Circuitry 180 comprises a linear voltage regulator, namely, a 5-volt regulator, for supplying power to the integrated circuits illustrated in FIG. 8. Furthermore, circuitry 182 comprises a bypass circuit that is operative to filter noise from the integrated circuitry of control electronics 184.

Figure 9:
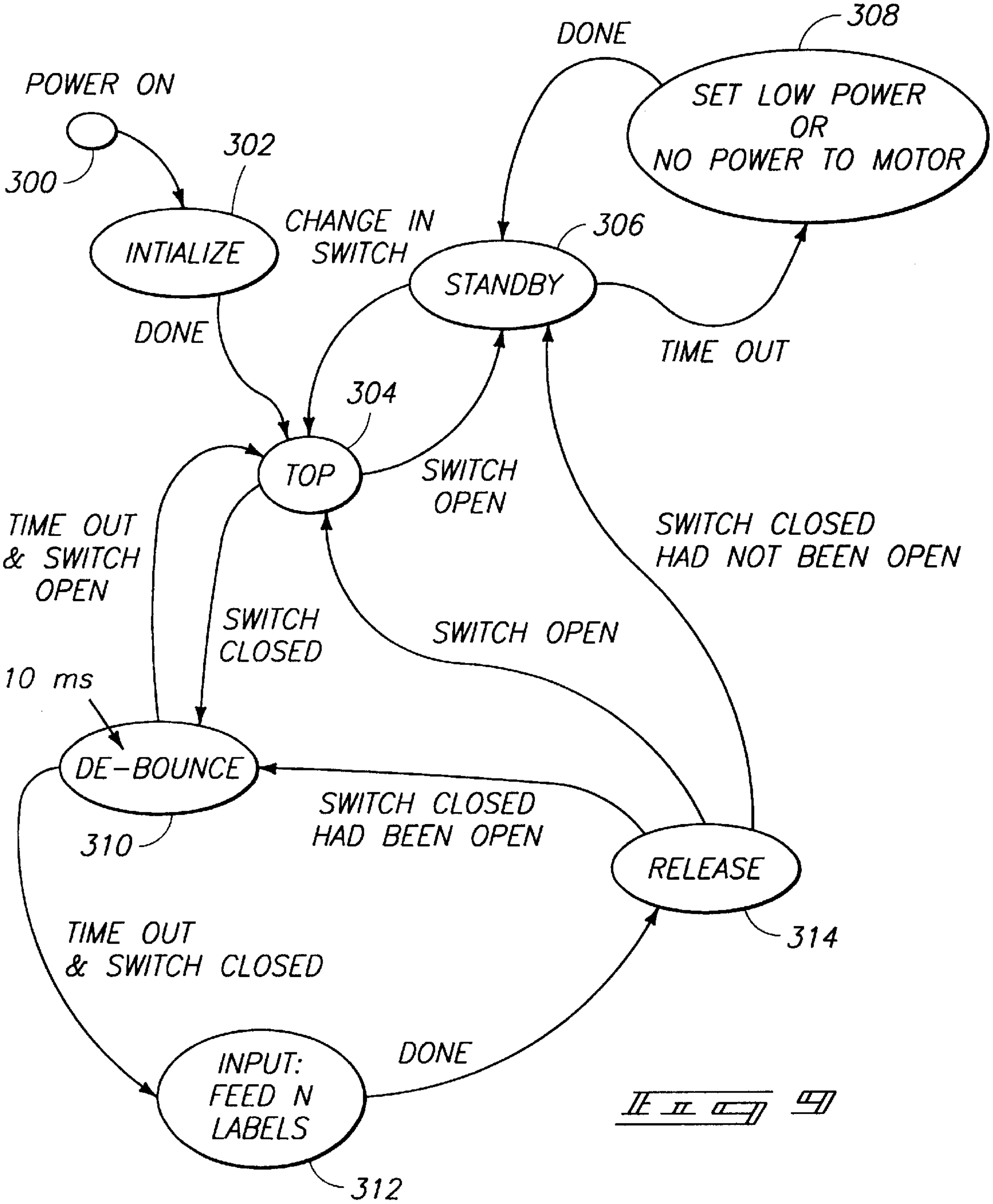
FIG. 9 is a general state diagram depicting the various operating states for the hand-held labeller of FIGS. 1–8.

FIG. 9 illustrates a general state diagram for a first level logic flow diagram for programming of the processor of microprocessor 164 (see FIG. 8) of the hand labeller. The general state diagram forms an implementation program for feeding labels to a label delivery apparatus, or peel plate assembly, of a hand labeller for delivery to articles. The general state diagram is implemented automatically via the logic flow diagram of FIGS. 10–16 by a software program implementation realized in computer hardware.

According to FIG. 9, a "POWER ON" state 300 leads to an "INITIALIZE" state 302. Additionally, a "TIME OUT POSITION (TOP)" state 304 can be reached from a "STANDBY" state 306, a "DE-BOUNCE" state 310, and a "RELEASE" state 314.

More particularly, "POWER ON" state 300 represents the initial step of powering up the labeller by supplying power via one of battery pack 26, AC power supply 226, or batteries contained internally of the labeller handle. Once the labeller is powered up, the labeller status is updated by initiating the "INITIALIZE" state 302. "INITIALIZE" state 302 represents the initialization of components within the labeller via the microcontroller. For example, the drive motor state initialization variables are set by the microcontroller after detecting the switch configuration that has been set on dip switch 165 (see FIG. 4). Once the initialization is complete, the state moves to "TOP" state 304.

"TOP" state 304 comprises a Time Out Position (TOP) where the labeller is in a resting state and the peel plate assembly is disengaged from the internal contact switch 154 (see FIG. 4). If the switch remains open, the status moves to "STANDBY" state 306. If the switch closes due to engagement of peel plate assembly 38 (see FIG. 2) with an article, the status moves to "DE-BOUNCE" state 310.

"STANDBY" state 306 comprises a state where the switch state is tested, and where a time out delay is initiated when the contact switch 154 (of FIG. 4) remains open. When the contact switch remains open, the state proceeds to "SET LOW POWER OR NO POWER TO MOTOR" state 308. If the contact switch closes, the state proceeds to "TOP" state 304.

"SET LOW POWER OR NO POWER TO MOTOR" state 308 comprises a state where power supply to motor 146 (of FIG. 4) is reduced or eliminated. Transfer to state 308 from state 306 corresponds with a "TIME OUT" condition. Once the power supply has been reduced or eliminated (is "DONE" ), the state returns to "STANDBY" state 306.

"DE-BOUNCE" state 310 is realized from "TOP" state 304 when contact switch 154 (of FIG. 4) is closed. Furthermore, state 310 is realized from "RELEASE" state 314 when contact switch 154 (of FIG. 4) was previously closed, but is now open. To do this, the state of the switch is monitored and a processor register is adjusted to indicate that the switch has been open for more than 10 milliseconds. When the time out has exceeded 10 milliseconds and the contact switch 154 (of FIG. 4) is closed, the stated moves to "INPUT: FEED N LABELS" state 312.

"INPUT: FEED N LABELS" state 312 is realized from "DE-BOUNCE" state 310 when the 10 millisecond time out has passed and the contact switch 154 (of FIG. 4) is closed. State 312 initiates the feeding of a predetermined number "N" of labels. Typically, N has a value of one (1). More particularly, motor 146 (of FIG. 4) is moved to feed labels wherein the advance distance equals the number of motor steps divided by the number of labels capable of being supported about the outer circumference of drive roll 44 (of FIG. 5). Switch 154 is monitored and a register is adjusted to indicate that the switch has been open for more than 10 milliseconds. After implementing state 312, the process proceeds to "RELEASE" state 314.

"RELEASE" state 314 represents the state when a label has been delivered to an article, and peel plate assembly 38 has been separated from an article, corresponding to contact switch 154 (of FIG. 4) being released. After performing state 314, the process proceeds to state 306 when the switch is closed, but had not been open. More particularly, contact switch 154 (of FIG. 4) is monitored and a register is adjusted in order to indicate when the switch has been open for more than ten milliseconds. If it has not been open for more than ten milliseconds and the switch is closed, the condition is met, and the process proceeds to state 306. After performing state 314, the process proceeds to State 304 when the switch is open (for more than ten milliseconds). Finally, state 314 proceeds to state 310 when the switch is closed and had previously been open.

The logic flow diagram of FIGS. 10–16 is initiated automatically in response to powering up of the hand labeller of FIGS. 1–9. More particularly, the logic flow diagram forms an operating program that automatically initiates during power-up of the hand labeller.

According to Step "S1", RELEASE corresponds to the "RELEASE" state 314 of FIG. 9. After performing Step "S1", the process proceeds to Step "S2".

In Step "S2", the processor of microcontroller 164 (of FIG. 8) detects whether contact switch 154 (of FIGS. 4 and 8) is set low, or closed. If it is determined that the switch is set low, the process proceeds to Step "S3". If not, the logic flow diagram implementation proceeds to Step "S6".

In Step "S3", the processor detects whether the peel plate assembly and application roller have been disengaged from an article for more than ten milliseconds. Essentially, the peel plate assembly and application roller are pivoted to a disengaged, upward position for more than ten milliseconds. If the peel plate assembly is detected as being up for more than ten milliseconds, a damping feature is provided and the process proceeds to Step "S9". If not, the logic flow diagram implementation proceeds to Step "S6".

In Step "S4", "POWER ON" corresponds with the "POWER ON" state 300 depicted in FIG. 9. When such state is realized, the logic flow diagram implementation proceeds to Step "S5".

In Step "S5", the processor initializes operating characteristics associated with label delivery and advancement by setting motor state initialization variables that correspond to the settings on switch 165 (of FIG. 4). After performing Step "S5", the process proceeds to Step "S6".

In Step "S6", the labeller is configured in a "TIME OUT" position (TOP) corresponding with "TOP" state 304 (of FIG. 9). More particularly, the contact switch is in an open state and the processor directs operation to Step "S7".

Figure 16:
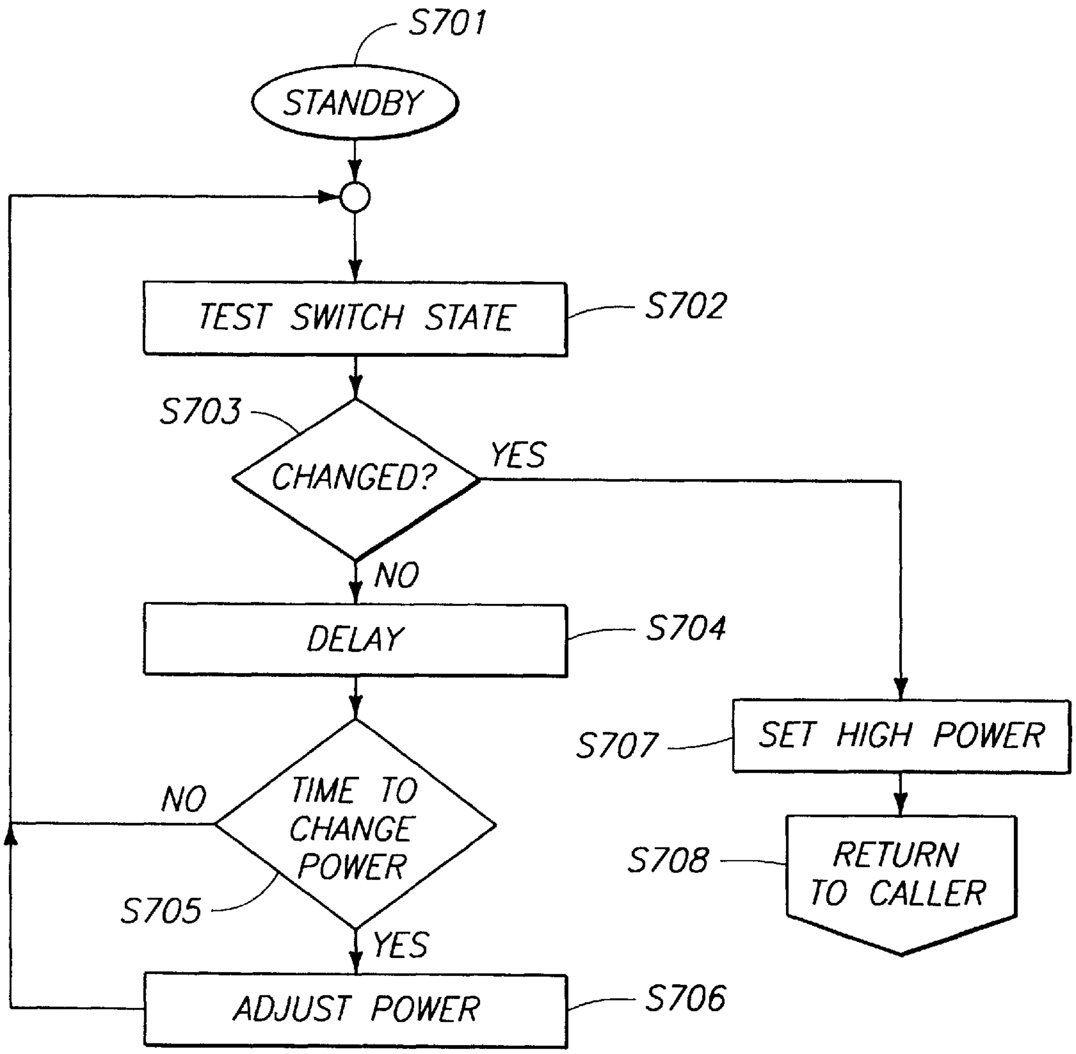
FIG. 16 is a flowchart illustrating the "Standby" subroutine implemented in Step "S7" of FIG. 10.

In Step "S7", the processor calls a "STANDBY" sub-routine depicted in greater detail with reference to FIG. 16. Such "STANDBY" sub-routine is implemented according to the steps depicted with reference to FIG. 16. After calling the "STANDBY" sub-routine, the process proceeds to Step "S8".

In Step "S8", the processor determines whether contact switch 154 (of FIG. 4) is low (or closed). If the contact switch is low, the process proceeds to Step "S9". If the process is not low, the process proceeds back to Step "S6".

In Step "S9", the processor realizes the "DE-BOUNCE" state 310 (of FIG. 9). More particularly, Step "S9" corresponds with a dampening feature which is implemented via Step "S10". After initiating such "DE-BOUNCE" feature in Step "S9", the process proceeds to Step "S10".

In Step "S10", the processor initiates a timing delay in the range of 10–12 milliseconds. Once such delay has been initiated via a clock within the processor, the process proceeds to Step "S11".

In Step "S11", the processor determines whether contact switch 154 (of FIG. 4) is low (or closed). If the switch is low, the process proceeds to Step "S12". If not, the process returns to Step "S6".

In Step "S12", the processor directs implementation to an "INPUT" sub-routine depicted generally in FIG. 11.

Figure 10:
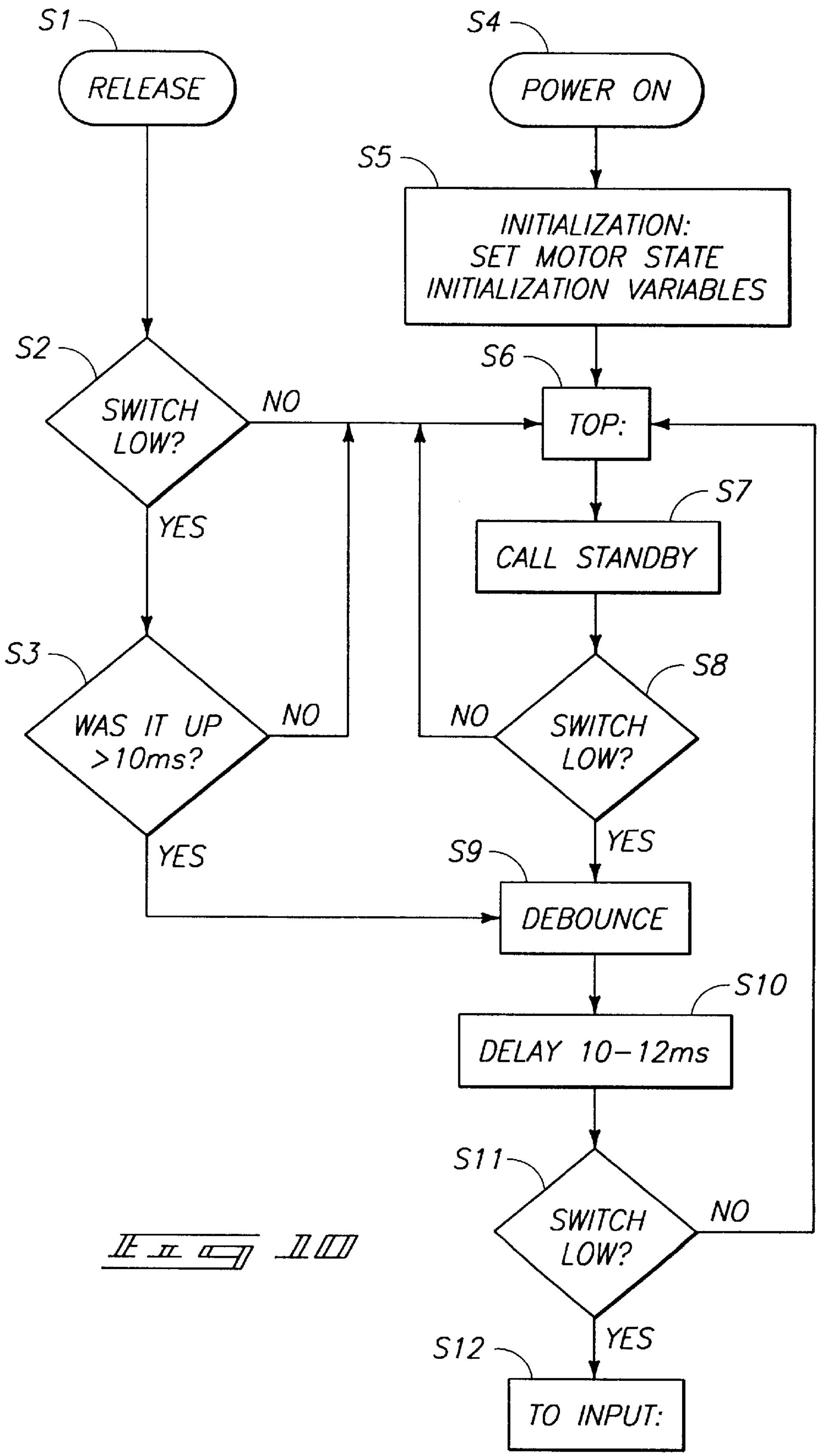
FIG. 10 is a flowchart illustrating the "POWER ON", "RELEASE" and "TOP" states for the hand labeller.

According to Step "S12" of FIG. 10, the particulars are implemented according to the sub-routine steps illustrated in FIG. 11. Namely, the processor initiates an "INPUT" sub-routine at Step "S13". After initiating the sub-routine at Step "S13", the process proceeds to Step "S14". In Step "S14", the processor directs re-setting of a "SWITCH_UP" register to a value of ten milliseconds. Additionally, the processor sets power to motor 146 (of FIG. 4) to a "HIGH" state. Additionally, the processor initiates reading of dip switch 165 (of FIG. 4) to determine individual switch settings by way of a test operation. Such switch settings predetermine the number of labels that are delivered per revolution of motor 146 (of FIG. 4). Finally, the reading of such switch predetermines which branch is followed from Step "S14"; namely, whether the number of labels provided along the outer circumference of drive roll 44 (of FIG. 1) contains a predetermined number of labels along its outer circumference (ranging from four to ten). Step "S14" determines the number of labels, then proceeds to one of Steps "S15" or "S16", depending on whether the particular label size corresponds to a particular number of labels fitting along the outer circumference of the drive roll.

In Step "S15", it has been predetermined that the labels are sized and spaced such that six, seven or nine labels will fit along the outer circumference of the drive roll. According to Step "S15", the number of motor steps is set equal to "a". For example, one/two steps can be provided per revolution.

An algorithm is then used to determine the number of steps based on the predetermined sequence and number of labels. After performing Step "S15", the process proceeds to Step "S17".

In Step "S16", the predetermined condition that four, five, eight or ten labels are provided about the circumference of the drive roll is met. According to Step "S16", the processor sets the number of motor steps equal to "a". For example, one/two steps are provided per revolution, divided by the number of labels that exists per revolution. After performing Step "S16", the process proceeds to Step "S17".

Figure 12:
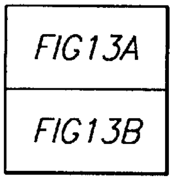
FIG. 12 is a drawing layout diagram illustrating the assembly details for FIGS. 13A and 13B.

In Step "S17", the processor calls a "MOTOR_STEP" sub-routine, depicted in greater detail with reference to FIGS. 12–13. Following implementation of the sub-routine of Step "S17", the process proceeds to Step "S18".

In Step "S18", the processor directs operation of the labeller to proceed to "RELEASE", which is Step "S1", depicted in FIG. 10.

Figure 13A:
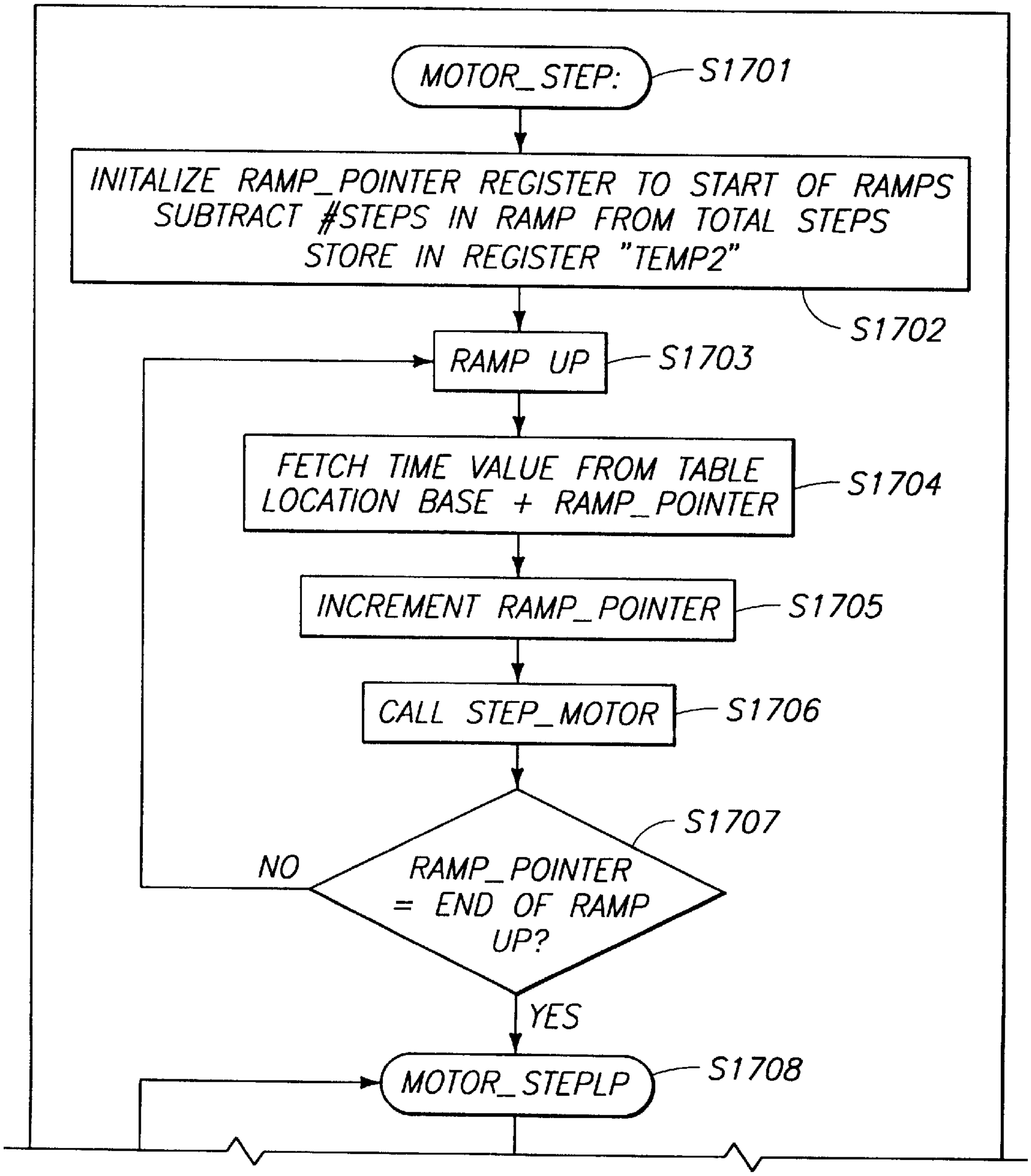
Figure 17B:
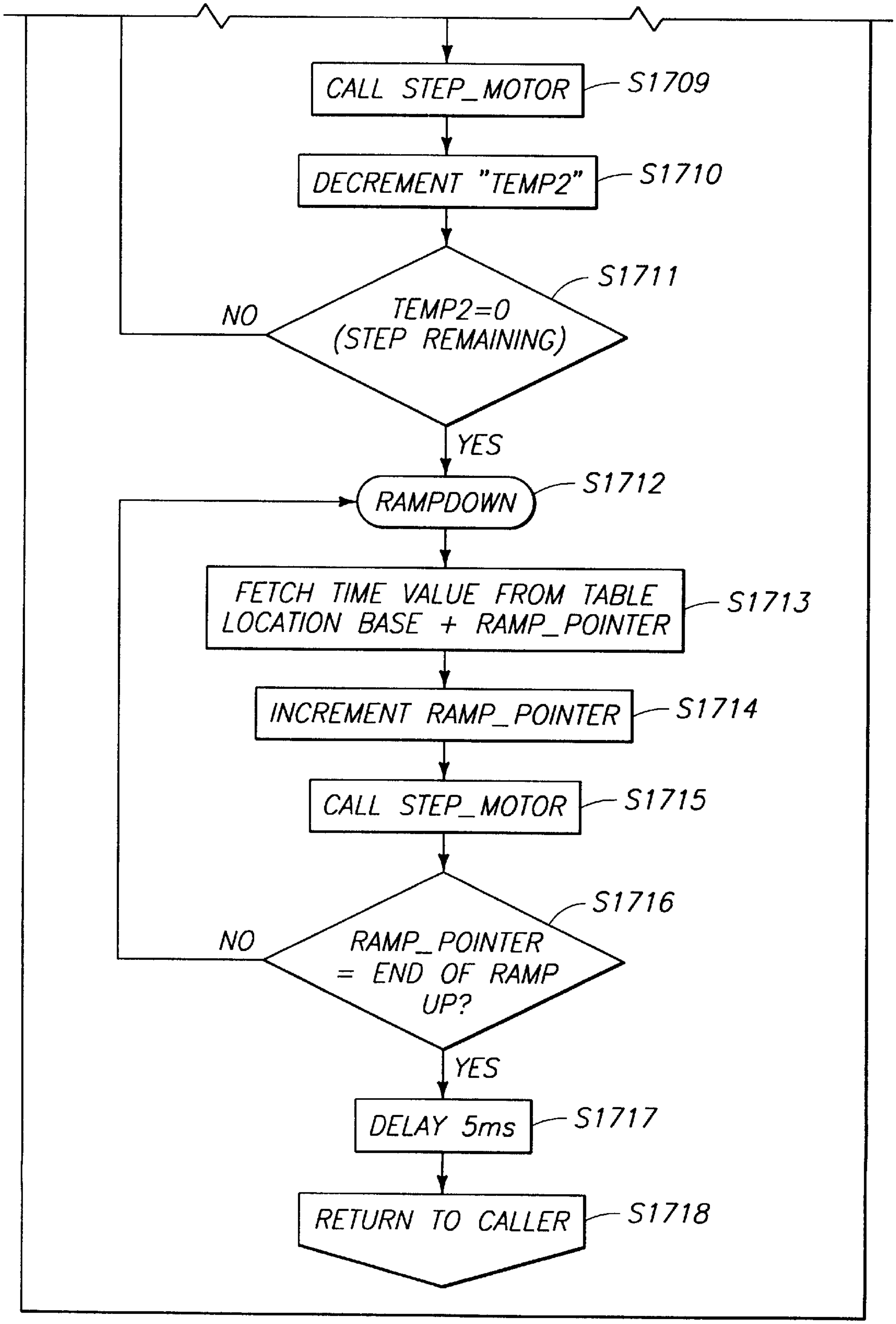
FIG. 17 is a perspective view of an alternatively constructed electronic hand-held labeller configured to deliver labels for electronic article surveillance systems or labels having resonant circuits.

FIG. 12 illustrates the assembly of FIGS. 13A and 13B comprising a flowchart diagram of a "MOTOR_STEP" sub-routine for incrementing movement of motor 146 (of FIG. 4) a desired amount so as to feed a subsequent label for delivery by a user. More particularly, the flowchart sub-routine of FIGS. 13A and 13B is initiated at Step "S1701" in direct response from Step "S17" of FIG. 11. Step "S1701" initiates the implementation of the "MOTOR_STEP" sub-routine. Following initiation of this sub-route via Step "S1701", the process proceeds to Step "S1702".

In Step "S1702", the processor initiates a "RAMP_POINTER" register to start of RAMPS. The processor then subtracts the number of step in a RAMP from the total number of steps, then stores the resulting number in a register labelled "TEMP2". After performing Step "1702", the process proceeds to Step "S1703".

In Step "S1703", the processor initiates "RAMP UP", a feedback loop within the sub-routine. After initiating Step "S1703", the process proceeds to Step "S1704".

Step "S1704", the processor fetches a time value from a look-up table location "BASE+RAMP_POINTER". After performing Step "S1704", the process proceeds to Step "S1705".

In Step "S1705", the processor increments "RAMP_POINTER". After performing Step "S1705", the processor proceeds to Step "S1706".

In Step "S1706", the processor calls "STEP_MOTOR". After implementing Step "S1706", the processor proceeds to Step "S1707".

In Step "S1707", the processor determines whether "RAMP_POINTER" equals "END OF RAMP UP". If the values in such registers are equal, the process proceeds to Step "S1708". If not, the process returns to Step "S1703".

In Step "S1708", the processor initiates a feedback loop section of the sub-routine entitled "MOTOR_STEP LP". After initiating the feedback loop via Step "S1708", the process proceeds to Step "S1709".

In Step "S1709", the processor calls "STEP_MOTOR". After performing Step "S1709", the process proceeds to Step "S1710".

In Step "S1710", the processor decrements "TEMP2". After performing Step "S1710", the processor proceeds to Step "S1711".

In Step "S1711", the processor determines whether "TEMP2" equals 0 (whether any steps remain). If it is determined that "TEMP2" equals 0, the processor proceeds to Step "S1712", ending the feedback loop. If it is determined that "TEMP2" does not equal 0, the process returns to Step "S1708".

In Step "S1712", the processor initiates a new feedback loop within the sub-routine. After initiating the feedback loop via Step "S1712", the processor proceeds to Step "S1713".

In Step "S1713", the processor fetches a time value from a look-up table location "BASE+RAMP_POINTER". After performing Step 15 "S1713", the processor proceeds to Step "S1714".

In Step "S1714", the processor increments "RAMP_POINTER". After performing Step "S1714", the processor proceeds to Step "S1715".

In Step "S1715", the processor calls "STEP_MOTOR". After performing Step "S1715", the processor proceeds to Step "S1716".

In Step "S1716", the processor determines whether "RAMP_POINTER" equals "END OF RAMP UP". If it is determined that such values are equal, the processor proceeds to Step "S1717". If not, the processor returns to Step "S1712".

In Step "S1717", the processor initiates a delay of five milliseconds. After performing Step "S1717", the processor proceeds to Step "S1718". In Step "S1718", the processor initiates a return to caller.

Pursuant to the sub-routine flowchart depicted in FIGS. 13A and 13B, Steps "S1706", "S1709" and delay Step "S1717" each call a sub-routine which monitors activity of contact switch 154 (of FIG. 4).

Figure 14:
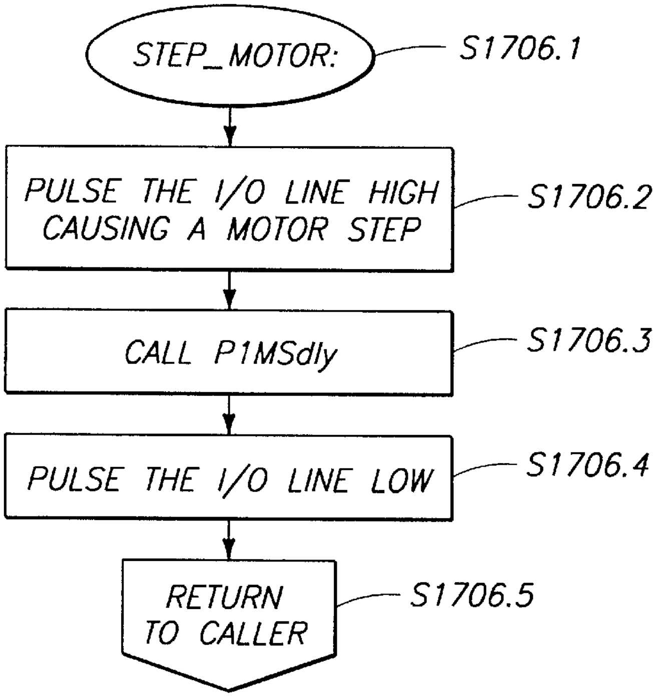
FIG. 14 is a flowchart illustrating the "Step_motor P1MSdly" subroutine implemented in Steps "S1709" and "S1715" of FIGS. 13A and 13B.

FIG. 14 illustrates an implementation of the sub-routine for Steps "S1706" and "S1715", as shown in FIGS. 13A and 13B, respectively. More particularly, the sub-routine is initiated by the processor as Step "S1706.1". Following initiation of the sub-routine via Step "S1706.1", the processor proceeds to Step "S1706.2".

In Step "S1706.2", the processor pulses the input/output (I/O) line to a high value, causing a motor step to occur. After implementing Step "S1706.2", the processor proceeds to Step "S1706.3".

Figure 15:
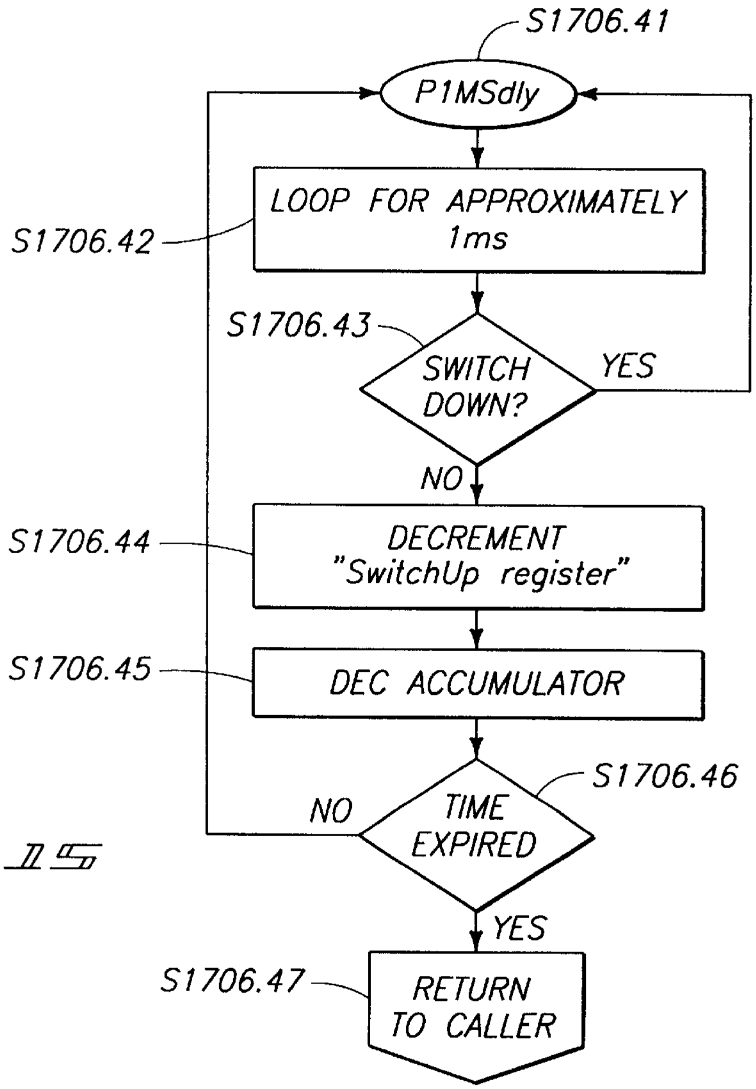
FIG. 15 is a flowchart illustrating the "P1MSdly" subroutine used in the subroutine of FIG. 14.

In Step "S1706.3", the processor calls sub-routine "P1MSdly", as shown in FIG. 15. After implementing the sub-routine of FIG. 15 within Step "S1706.3", the processor proceeds to Step "S1706.4".

In Step "S1706.4", the processor pulses the input/output (I/N) line to a low value. After implementing Step "S1706.4", the processor proceeds to Step "S1706.5".

In Step "S1706.5", the processor returns to the caller within the sub-routine of FIGS. 13A and 13B.

According to the sub-routine depicted in FIG. 15, the processor proceeds to initiate a feedback loop according to the sub-routine via Step "S1706.41". After initiating the feedback loop via Step "S1706.41", the processor proceeds to Step "S1706.42".

In Step "S1706.42", the processor initiates a feedback loop for approximately one millisecond. Following implementation of Step "S1706.42", the processor proceeds to Step "S1706.43".

In Step "S1706.43", the processor determines whether the switch still remains down. If the switch still remains down, the process returns to Step "S1706.41". If not, the process proceeds to Step "S1706.44".

In Step "S1706.44", the processor decrements "SwitchUp register". After performing Step "S1706.44", the process proceeds to Step "S1706.45".

In Step "S1706.45", the processor decrements the accumulator. After performing Step "S1706.45", the processor proceeds to Step "S1706.46".

In Step "S1706.46", the processor determines whether the time for the sub-routine is completely expired. If the time has expired, the process proceeds to Step "S1706.47". If not, the process returns to Step "S1706.41".

In Step "S1706.47", the processor returns to the caller; namely, the processor returns to the sub-routine flowchart depicted in FIG. 14, proceeding with Step "S1706.4".

FIG. 16 illustrates a sub-routine implemented via Step "S7" of FIG. 10. More particularly, such sub-routine is initiated by the processor at Step "S701" in order to initiate a standby mode of operation. Following initiation of the sub-routine via Step "S701", the process proceeds to Step "S702".

In Step "S702", the processor initiates a test switch state which determines the open or closed status of switch 154 (of FIG. 4). After implementing Step "S702", the process proceeds to Step "S703".

In Step "S703", the processor determines whether the test switch state has changed. If the test switch state has changed, the processor proceeds to Step "S707". If not, the process proceeds to Step "S704".

In Step "S704", the processor initiates a delay response. After performing Step "S704", the processor proceeds to Step "S705".

In Step "S705", the processor determines whether it is time to change power to the motor. If sufficient time has passed, the processor proceeds to Step "S706". If not, the process returns to the top, proceeding with Step "S702".

In Step "S706", the processor adjusts power to the motor. After performing Step "S707", the process returns, implementing Step "S702".

In Step "S707", the processor sets the power high to the motor. After performing Step "S707", the processor proceeds to Step "S708".

In Step "S708", the processor returns to caller; namely, the processor returns to the flowchart of FIG. 10, proceeding with Step "S8".

Figure 17:
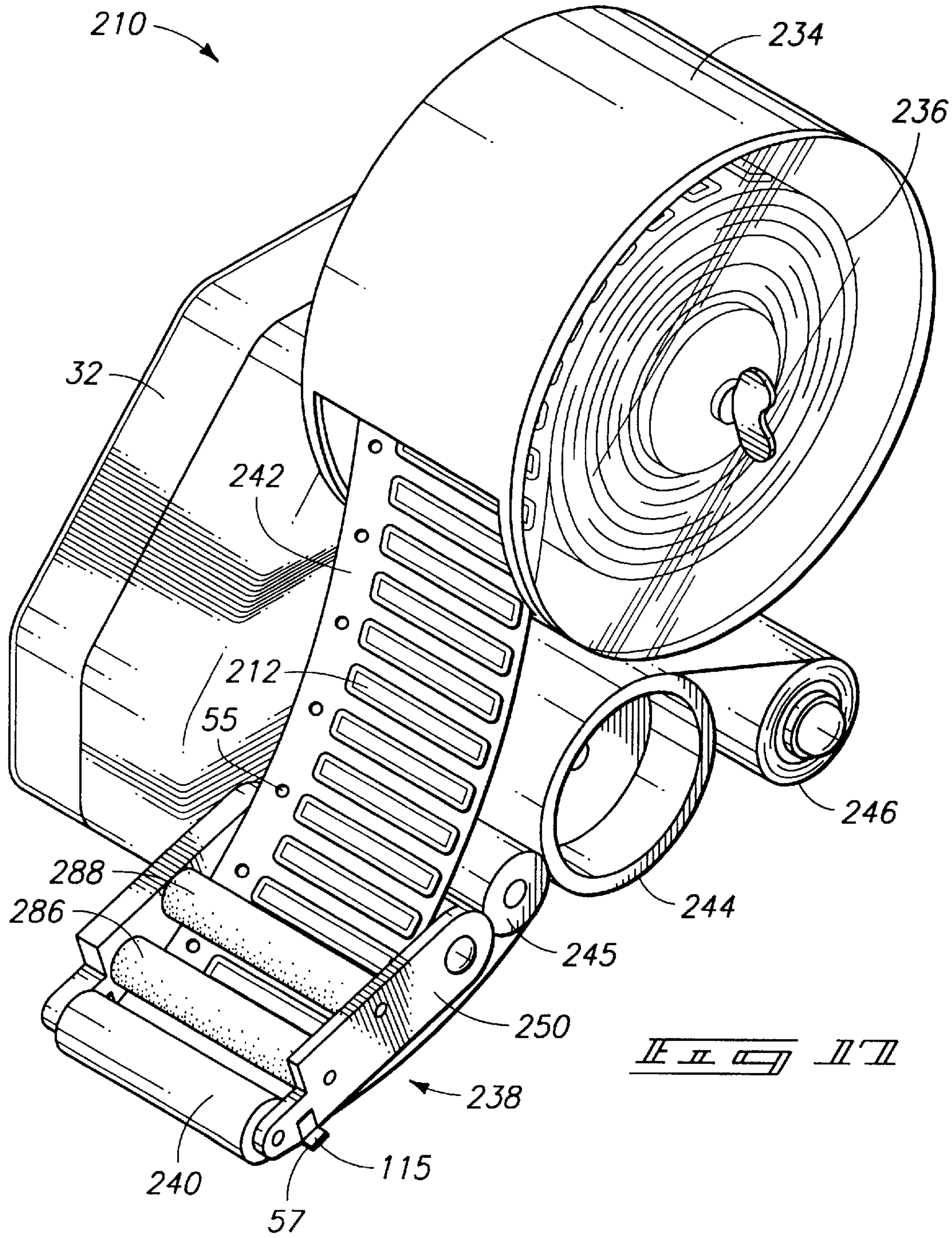

FIG. 17 illustrates an alternative embodiment hand labeller 210 configured for delivering adhesive-backed security tags 212 to articles or goods, such as manufactured consumer goods, or associated packaging. One such security tag comprises anti-shoplifting tags, or labels, that are adhesively applied to products, either during manufacturing, packaging, or by retailers. Such tags comprise electronic article surveillance (EAS), which has been used to reduce theft of products, particularly in the retail sector.

As shown in FIG. 17, hand labeller 210 is configured essentially identically to labeller 10, as described with reference to FIGS. 1–16. For example, housing 32 is formed substantially identically thereto, with the identical hardware and software. However, label reel canister 34 is provided with additional depth so as to accommodate a substantially wider label reel 236 than is used in the device of FIGS. 1–16.

Such label reel 236 includes carrier web 42, having a plurality of spaced-apart holes 55 provided for driving web 242 and labels 212 carried thereon. Peel plate assembly 238 is configured to individually remove labels 212 from web 242, with such removed labels being positioned onto an associated shelf 57.

Peel plate assembly 238 is constructed substantially identical to that utilized in the device of FIGS. 1–7. However, a pair of guide rollers 286 and 288 are provided on a widened peel plate 250 sufficiently sized to receive carrier web 242 there along. Guide rollers 286 and 288 are formed from a sufficiently compliant material such that labels 212 can fit between each guide roller and peel plate member 250. Accordingly, individual labels 212 are applied to articles via shelf 57 and applicator roll 240.

A finger 115 on shelf 57 enables opening and closing of shelf 57 with peel plate 250 by a user when loading and unloading carrier web 242 and labels 212 there about. Such finger 115 provides sufficient tactile engagement with a user's finger to enable pivotal engagement/disengagement of shelf 57 from peel plate 250.

Figure 18:
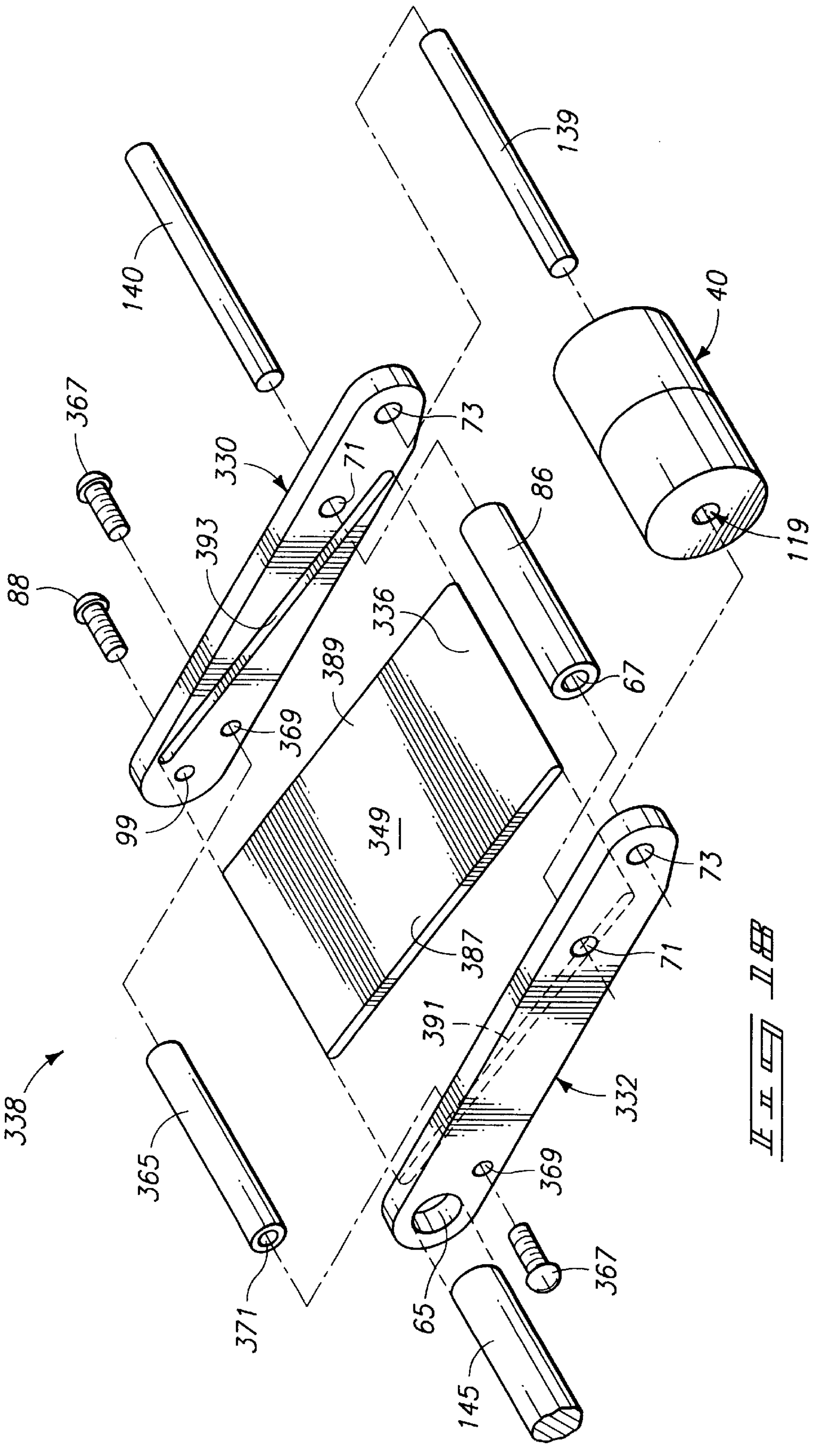
FIG. 18 is an exploded perspective view of one alternative construction for the peel plate assembly depicted in FIGS. 1–7.

FIG. 18 is an exploded perspective view of one alternative construction for the peel plate assembly depicted in FIGS. 1–7. More particularly, a label applicator mechanism, or peel plate assembly, 338 is shown configured in a form particularly suited for use on hand-held labellers such as labeller 10 (see FIGS. 1–16). However, it is understood that such label applicator mechanism 338 can be implemented on any type of label application machine that is suited for applying labels to individual articles. It is envisioned that such label applicator mechanism can be provided to deliver labels from hand labellers, automated labelling machines such as those used to apply labels to tray-supported fruits and vegetables, or on any other mechanism operative to apply adhesive-backed labels.

As shown in FIG. 18, peel plate assembly 338 includes a support member that is provided by a pair of side walls 330 and 332. A guide member is formed by a piece of low-friction material configured in the form of a strip, or web, 349. Guide member, or web, 349 forms a tab 387 and 389, respectively, on each edge. A complementary slot 391 and 393 is provided on each side wall 332 and 330, respectively. Hence, guide member 349 is inserted into slots 391 and 393 so as to be rigidly secured and entrapped between side walls 332 and 330.

Additionally, a cylindrical spacer 365 is mounted between the side walls 330 and 332 to secure such side walls rigidly together. Furthermore, pin 140 is press-fit into apertures 71 in each side wall 330 and 332, respectively, entrapping guide roller 86 for rotation therebetween. Furthermore, pin or dowel 139 is similarly received and press-fit through apertures 73 into side walls 330 and 332 to retain application roller 40 for rotation therebetween.

Accordingly, spacer 365 cooperates with fasteners 88 via apertures 369 and pin 140, as well as dowel 139, to retain side walls 330 and 332 together so as to entrap web 349 therebetween. Such assembly provides for a rigid securement of web 349 along which a web containing labels is carried in operation.

According to one construction, web 349 is formed from an molded piece of polytetrafluoroethylene, or Teflon™. Optionally, other low-friction materials can be utilized to form web 349. Web 349 can be cut from a single, elongate strip of molded material into a desired width.

As shown in FIG. 18, peel plate assembly 338 is mounted onto shaft 145 solely by way of a threaded fastener 88 which is secured through a complementary threaded aperture within shaft 145. Tightening of fastener 88 secures peel plate assembly 338 onto shaft 145, preventing any relative rotation therebetween.

FIG. 19 is an exploded perspective view of another alternative construction for the peel plate assembly depicted in FIGS. 1–7 and FIG. 17. More particularly, a label applicator mechanism, or peel plate assembly, 438 is shown configured in a form particularly suited for use on hand-held labellers such as labeller 10 (see FIGS. 1–16). However, it is understood that label applicator mechanism 438 can be implemented on any type of label application machine that is suited for applying labels to individual articles.

The implementation depicted in FIG. 19 includes further benefits over the embodiment depicted in FIG. 18 in that a low-friction web 449 is carried between a pair of side walls 430 and 432, via a pair of corresponding curved slots 493 and 491, respectively. In this manner, a somewhat flexible piece of low-friction material can be used to form web 449, such as polytetrafluoroethylene (or Teflon™) wherein web 449 is cut from a continuous strip of flat sheet material. Accordingly, web 449 can be formed into a complex, curved shape from a relatively lowcost operation by cutting segments from a common flat strip of material.

Side walls 430 and 432 each contain a compound, curved slot 493 and 491, respectively. Such slot imparts a bi-curved concave and convex surface to web 449, in assembly. Such curves strengthen the resulting low-friction surface.

As shown in FIG. 19, a cylindrical spacer 465 imparts additional securement between side walls 430 and 432, via way of fasteners 467 and apertures 469. In the construction depicted in FIG. 19, shaft 145 and cylindrical spacer 465 cooperate to support web 449 immediately adjacent thereto and there along. Furthermore, pin 140 and dowel 139 are press-fit, which further secures side walls 430 and 432 together.

According to the construction depicted in FIG. 19, web 449 provides a low-friction surface upon which a web and labels can be delivered below guide roller 86 and toward application roller 40. Such bi-curved surface presents labels along the leading edge 436 in a manner which is substantially horizontal and desirable when applying labels beneath application roller 40 to articles.

It is to be understood that the alternative constructions for a peel plate assembly depicted in FIGS. 18 and 19 as peel plate assemblies 338 and 438, respectively, can also be implemented with the additional features of shelf 57, as depicted in the embodiment of FIG. 7. Furthermore, it is understood that the provision of web 349 (see FIG. 18) and web 449 (see FIG. 19) can be constructed from any of a number of relatively low-friction and chemically non-reactive materials, including polytetrafluoroethylene. Furthermore, such webs can be constructed of any relatively flexible, yet low-friction, material imparting desirable delivery characteristics which reduce frictional drag along the bottom of a carrier web and reduce the tendency for adhesives or glues to stick there along.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A label applicator mechanism, comprising:

a peel plate member configured to support a carrier web containing a plurality of sequentially supported labels for delivery to individual articles; and a guide member comprising a low-friction insert piece, the guide member supported by the peel plate member and having an application edge over which the carrier web is folded so as to separate individual labels from the carrier web as the carrier web is moved under tension over the application edge;

wherein the guide member has a coefficient of friction with the carrier web which is less than the coefficient of friction of the peel plate member.

2. The label applicator mechanism of claim 1 wherein the peel plate member comprises a pair of side walls, and the guide member comprises an insert piece interposed between the side walls.

3. The label applicator mechanism of claim 2 wherein the insert piece includes a pair of tabs, one tab provided along each edge, each side wall having a complementary slot configured to receive one of the tabs.

4. A label applicator mechanism, comprising:

a support member configured to support a carrier web containing a plurality of sequentially supported labels for delivery to individual articles; and a guide member comprising a polytetrafluoroethylene surface, the guide member supported by the support member and having an application edge over which the carrier web is folded so as to separate individual labels from the carrier web as the carrier web is moved under tension over the application edge;

wherein the guide member has a coefficient of friction with the carrier web which is less than the coefficient of friction of the support member.

5. A label applicator mechanism, comprising:

a support member configured to support a carrier web containing a plurality of sequentially supported labels for delivery to individual articles;

a guide member supported by the support member and having an application edge over which the carrier web is folded so as to separate individual labels from the carrier web as the carrier web is moved under tension over the application edge; and a guide roller carried by the support member adjacent the guide member, provided upstream of the application edge, and operative to guide a carrier web and label along the guide member and toward the application edge;

wherein the guide member has a coefficient of friction with the carrier web which is less than the coefficient of friction of the support member.

6. A hand-held labelling machine, comprising:

a housing configured to carry a carrier web and a plurality of labels;

a label delivery apparatus supported by the housing and configured to move the carrier web and the labels for delivery to individual articles; and a label applicator having a support member, a guide member, and a label support shelf comprising a support surface, the label applicator supported by the housing and configured to separate and deliver the labels from the carrier web to individual articles;

wherein the guide member has a coefficient of friction with the carrier web which is less than the coefficient of friction of the support member;

and wherein the support shelf is pivotally carried by the support member at a first end for releasable engagement along a second end with the support member.

7. The hand-held labelling machine of claim 6 wherein the label support shelf comprises a pivot finger provided along the first end of the support surface and a releasable retention finger provided along the second end of the support surface, a pivot slot being provided in the support member for pivotally retaining the pivot finger and a complementary retention slot being provided in the support member for releasably retaining the retention finger.

8. A hand-held labelling machine, comprising:

a housing configured to carry a carrier web and a plurality of labels;

a label delivery apparatus supported by the housing and configured to move the carrier web and the labels for delivery to individual articles; and a label applicator supported by the housing and configured to deliver the labels from the carrier web to individual articles, the label applicator including a support member, a guide member, and a guide roller, the guide roller carried by the label applicator proximate the guide member;

wherein the guide member is operative to separate the labels from the carrier web, and the guide member includes an application edge having a coefficient of friction with the carrier web which is less than the coefficient of friction of the support member.

9. A hand-held labelling machine, comprising:

a housing configured to carry a carrier web and a plurality of labels;

a label delivery apparatus supported by the housing and configured to move the carrier web and the labels for delivery to individual articles; and a label applicator supported by the housing and configured to deliver the labels from the carrier web to individual articles, the label applicator having a support member and a guide member;

wherein the support member comprises a peel plate having a pair of side walls and a recess, the guide member comprises an insert piece carried by the support member along the recess, the guide member is operative to separate the labels from the carrier web, and the guide member includes an application edge having a coefficient of friction with the carrier web which is less than the coefficient of friction of the support member.

10. The hand-held labelling machine of claim 9 wherein the label applicator further comprises a guide roller rotatably supported within the delivery slot, proximate the guide member, the carrier web and labels being received between the guide member and the guide roller.

11. A hand-held labelling machine, comprising:

a housing configured to carry a carrier web and a plurality of labels;

a label delivery apparatus supported by the housing and configured to move the carrier web and the labels for delivery to individual articles; and a label applicator supported by the housing and configured to deliver the labels from the carrier web to individual articles, the label applicator having a support member and a guide member;

wherein the guide member is formed from a low-friction material comprising polytetrafluoroethylene, the guide member is operative to separate the labels from the carrier web, and the guide member includes an application edge having a coefficient of friction with the carrier web which is less than the coefficient of friction of the support member.

12. A label applicator mechanism, comprising:

a support member configured to support a carrier web containing a plurality of adhesive-backed labels for delivery to articles;

a guide member carried by the support member having an application edge over which the carrier web is drawn under tension to separate individual labels therefrom; and a guide roller carried by the support member adjacent to the guide member, the label and the carrier web configured to be received between the guide roller and the guide member upstream of the application edge;

wherein the labels tend to eject adhesive onto the carrier web during storage and delivery, the guide member having a lower coefficient of contact friction with the carrier web than the support member to reduce adhesive gumming-up of the applicator mechanism.

13. The label applicator mechanism of claim 12 wherein the support member comprises a peel plate.

14. The label applicator mechanism of claim 13 wherein the guide member comprises a low-friction insert piece carried by the support member.

15. The label applicator mechanism of claim 13 wherein the support member comprises a pair of elongate side walls and the guide member comprises a sheet of relatively low-friction material carried between the side walls.

16. The label applicator mechanism of claim 15 wherein the sheet of material forms the application edge.

17. The label applicator mechanism of claim 12 wherein the support member includes a pair of laterally disposed slots and the guide member includes a pair of complementary tabs configured to interfit in the support member slots so as to retain the guide member with the support member.

18. The label applicator mechanism of claim 12 wherein the guide member comprises a polytetrafluoroethylene material.

19. The label applicator mechanism of claim 12 wherein the support member, the guide member and the guide roller cooperate to provide a peel plate assembly.

20. The label applicator mechanism of claim 12 further comprising an application roller carried by the support member and spaced apart from the application edge.

* * * * *

UNITED STATES PATENT AND TRADEMARK OFFICE
CERTIFICATE OF CORRECTION

PATENT NO. : 6,230,780 B1
DATED : May 15, 2001
INVENTOR(S) : William R. Rietheimer It is certified that error appears in the above-identified patent and that said Letters Patent is hereby corrected as shown below:

Column 6,
Line 46, delete "at 160 milliamps).", and insert -- at 160 milliamps. --

Column 7,
Line 66, delete "can be provide.", and insert -- can be provided. --

Column 10,
Lines 13-14, delete "an array of drive pins 52 are positioned", and insert -- an array of drive pins 52 is positioned --.

Column 13,
Line 9, delete "from peel plate 57.", and insert -- from peel plate 50. --.
Lines 62-63, delete "Delrin pin 139", and insert -- Delrin™ pin 139 -- .

Column 16,
Line 12, delete "is secured to gear 150", and insert -- is secured to gear 151 --.

Column 21,
Line 31, delete "of step in a RAMP", and insert -- of steps in a RAMP --.
Line 39, delete "Step "S1704",", and insert -- In Step "S1704", --.
Line 40, delete "BASE+RAMP_POINTER", and insert
-- "BASE + RAMP_POINTER" --.

UNITED STATES PATENT AND TRADEMARK OFFICE

CERTIFICATE OF CORRECTION

PATENT NO. : 6,230,780 B1
DATED : May 15, 2001
INVENTOR(S) : William R. Rietheimer It is certified that error appears in the above-identified patent and that said Letters Patent is hereby corrected as shown below:

<u>Column 22</u>,
Line 8, delete "BASE+RAMP_POINTER", and insert
-- "BASE + RAMP_POINTER" --.

Signed and Sealed this

Eighth Day of January, 2002

*Attest:*

JAMES E. ROGAN

*Attesting Officer*

*Director of the United States Patent and Trademark Office*